(12) United States Patent
Allen

(10) Patent No.: US 7,499,890 B1
(45) Date of Patent: Mar. 3, 2009

(54) CELLSITE BUDGETMASTER

(75) Inventor: Victor Allen, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 714 days.

(21) Appl. No.: 10/684,720

(22) Filed: Oct. 14, 2003

(51) Int. Cl.
*G06F 17/00* (2006.01)

(52) U.S. Cl. .......................... 705/400; 705/1

(58) Field of Classification Search ................ 705/400, 705/1, 37, 500, 26
See application file for complete search history.

(56) References Cited

U.S. PATENT DOCUMENTS

| | | | |
|---|---|---|---|
| 5,758,328 A * | 5/1998 | Giovannoli | 705/26 |
| 5,761,674 A | 6/1998 | Ito | |
| 5,918,219 A * | 6/1999 | Isherwood | 705/37 |
| 6,446,053 B1 * | 9/2002 | Elliott | 705/400 |
| 2003/0115163 A1 * | 6/2003 | Moore et al. | 705/500 |

OTHER PUBLICATIONS

"From a distance, Corbley, Kevin, Cellular Business v12n7 pp. 26-33".*
Think before you build, Costanzo, Chalres, Cellular Business v14n10 pp. 34-38.*

* cited by examiner

*Primary Examiner*—John W Hayes
*Assistant Examiner*—Rob Wu
(74) *Attorney, Agent, or Firm*—Robert Evora; Parks Knowlton LLC; Paul Knowlton, Esq.

(57) ABSTRACT

Methods and apparatuses are disclosed for cell site planning and for vendor selection. According to embodiments of this invention, a cell site planning information system receives initial cell site information, accesses historical cell site information and/or vendor information, and integrates the information to provide a proposed cell site design plan, to recommended vendors, to determine benchmark costs, and/or to provide billing records of the recommended vendors.

8 Claims, 43 Drawing Sheets

Foundation Design Form

1710
Water Table at 4' or higher: [No]

1720
Foundation Type: [Caisson]

1730
Tower Height: [140]

1740
Total Volume: [32]

1750
Foundation Design

Windspeed used for design 90 mph

CellSite Budget Master has calculated the following foundation:

For a 140 feet tall monopole with water table below 4', the foundations will be caissons at 6 feet diameter by 31 feet long. The total volume of concrete used is: 32 cubic yards.

[Apply] [Close] [Delete Design] [Calculate]

| speed | tower type | Water? | fdn type | Height | B1 (ft) | H1 (ft) | L1 (ft) | D1 (ft) | Vol (cy) | B2 (ft) | L2 (ft) | I (ft) | D2 (ft) | Pier (ft) | Vol (cy) | Tot. Vol. |
|---|---|---|---|---|---|---|---|---|---|---|---|---|---|---|---|---|
| 90 | GT | wo | PPDM | 300 | 4.50 | 4.50 | 18.00 | 8.00 | 40.50 | 6.75 | 6.75 | 2.00 | 4.00 | 2.00 | 3.61 | 44.11 |
| 90 | GT | wo | PPDM | 280 | 4.25 | 4.25 | 17.00 | 8.00 | 34.12 | 6.50 | 6.50 | 2.00 | 4.00 | 2.00 | 3.36 | 37.48 |
| 90 | GT | wo | PPDM | 260 | 4.00 | 4.00 | 16.00 | 8.00 | 28.44 | 6.25 | 6.25 | 2.00 | 4.00 | 2.00 | 3.13 | 31.57 |
| 90 | GT | wo | PPDM | 240 | 3.75 | 3.75 | 15.00 | 8.00 | 23.44 | 5.75 | 5.75 | 1.75 | 4.00 | 1.75 | 2.34 | 25.78 |
| 90 | GT | wo | PPDM | 220 | 3.25 | 3.25 | 13.00 | 8.00 | 15.26 | 5.25 | 5.25 | 1.75 | 4.00 | 1.75 | 1.99 | 17.24 |
| 90 | GT | wo | PPDM | 200 | 2.75 | 2.75 | 11.00 | 8.00 | 9.24 | 4.75 | 4.75 | 1.75 | 4.00 | 1.75 | 1.66 | 10.91 |
| 90 | GT | wo | PPDM | 180 | 2.50 | 2.50 | 10.00 | 8.00 | 6.94 | 4.75 | 4.75 | 1.75 | 4.00 | 1.75 | 1.66 | 8.61 |

| speed | tower type | Water? | fdn type | Height | B1 (ft) | L1 (ft) | Vol (cy) | B2 (ft) | L2 (ft) | Tot. Vol. |
|---|---|---|---|---|---|---|---|---|---|---|
| 90 | GT | w | CS | 300 | 3.0 | | | 4.0 | 20.0 | 29.7 |
| 90 | GT | w | CS | 280 | 3.0 | | | 4.0 | 18.0 | 28.0 |
| 90 | GT | w | CS | 260 | 3.0 | | | 4.0 | 17.0 | 26.8 |
| 90 | GT | w | CS | 240 | 3.0 | | | 4.0 | 13.0 | 21.8 |
| 90 | GT | w | CS | 220 | 2.5 | | | 4.0 | 16.0 | 14.6 |
| 90 | GT | w | CS | 200 | 2.5 | | | 3.0 | 13.0 | 12.7 |
| 90 | GT | w | CS | 180 | 2.5 | | | 3.0 | 11.0 | 11.6 |

| speed | tower type | Water? | fdn type | Height | B (ft) | L (ft) | Vol (cy) |
|---|---|---|---|---|---|---|---|
| 90 | MP | w | CS | 200 | 8.0 | 38.0 | 70.7 |
| 90 | MP | w | CS | 180 | 8.0 | 34.0 | 63.3 |
| 90 | MP | w | CS | 160 | 6.0 | 35.0 | 36.7 |
| 90 | MP | w | CS | 140 | 6.0 | 31.0 | 32.5 |
| 90 | MP | w | CS | 120 | 6.0 | 27.0 | 28.3 |
| 90 | MP | w | CS | 100 | 6.0 | 23.0 | 24.1 |
| 90 | MP | wo | CS | 300 | 8.0 | 43.0 | 80.1 |
| 90 | MP | wo | CS | 280 | 8.0 | 37.0 | 68.9 |
| 90 | MP | wo | CS | 260 | 6.0 | 48.0 | 50.3 |
| 90 | MP | wo | CS | 240 | 6.0 | 40.0 | 41.9 |
| 90 | MP | wo | CS | 220 | 6.0 | 33.0 | 34.6 |
| 90 | MP | wo | CS | 200 | 6.0 | 27.0 | 28.3 |
| 90 | MP | wo | CS | 180 | 4.0 | 39.0 | 18.2 |
| 90 | MP | wo | CS | 160 | 4.0 | 31.0 | 14.4 |
| 90 | MP | wo | CS | 140 | 4.0 | 24.0 | 11.2 |
| 90 | MP | wo | CS | 120 | 4.0 | 17.0 | 7.9 |
| 90 | MP | wo | CS | 100 | 4.0 | 12.0 | 5.6 |
| 90 | SS | wo | CS | 300 | 8.0 | 37.0 | 68.9 |
| 90 | SS | wo | CS | 280 | 8.0 | 31.0 | 57.7 |
| 90 | SS | wo | CS | 260 | 6.0 | 43.0 | 45.0 |
| 90 | SS | wo | CS | 240 | 6.0 | 36.0 | 37.7 |

90 mph

| B (ft) | L (ft) | t (ft) | D (ft) | Pier (ft) | Vol (cy) |
|---|---|---|---|---|---|
| 21.5 | 21.5 | 6.0 | 30.0 | | 31.4 |
| 20.0 | 20.0 | 6.0 | 24.0 | | 25.1 |
| 18.5 | 18.5 | 4.0 | 37.0 | | 17.2 |
| 17.0 | 17.0 | 4.0 | 29.0 | | 13.5 |
| 16.0 | 16.0 | 4.0 | 22.0 | | 10.2 |
| 15.0 | 15.0 | 4.0 | 16.0 | | 7.4 |
| 13.0 | 13.0 | 4.0 | 13.0 | | 6.1 |

| B (ft) | L (ft) | t (ft) | D (ft) | Pier (ft) | Vol (cy) |
|---|---|---|---|---|---|
| | | | | 3.0 | 136.3 |
| | | | | 3.0 | 119.0 |
| | | | | 3.0 | 102.9 |
| | | | | 3.0 | 88.1 |
| | | | | 3.0 | 79.0 |
| | | | | 3.0 | 70.4 |
| | | | | 3.0 | 58.5 |
| 21.5 | 21.5 | 2.5 | 12.0 | 3.0 | 40.2 |
| 20.0 | 20.0 | 2.5 | 12.0 | 3.0 | 30.5 |
| 18.5 | 18.5 | 2.5 | 12.0 | 3.0 | 23.5 |
| 17.0 | 17.0 | 2.5 | 12.0 | 3.0 | 19.1 |
| 16.0 | 16.0 | 2.5 | 12.0 | | |
| 15.0 | 15.0 | 2.5 | 12.0 | | |
| 13.5 | 13.5 | 2.5 | 12.0 | | |
| 12.0 | 12.0 | 2.0 | 12.0 | | |
| 10.0 | 10.0 | 2.0 | 12.0 | | |
| 8.5 | 8.1 | 2.0 | 12.0 | | |
| 7.0 | 7.0 | 2.0 | 12.0 | | |

| B (ft) | L (ft) | t (ft) | D (ft) | Pier (ft) | Vol (cy) |
|---|---|---|---|---|---|
| 37.0 | 37.0 | 3.0 | 6.0 | 4.0 | 157.00 |
| 35.0 | 35.0 | 3.0 | 6.0 | 4.0 | 141.00 |
| 34.0 | 33.0 | 3.0 | 6.0 | 4.0 | 129.55 |
| 32.0 | 31.0 | 3.0 | 6.0 | 4.0 | 115.11 |
| 30.0 | 29.0 | 3.0 | 6.0 | 4.0 | 101.55 |
| 28.0 | 27.0 | 2.5 | 6.0 | 4.0 | 75.59 |
| 26.0 | 25.0 | 2.5 | 6.0 | 3.0 | 63.33 |
| 24.0 | 23.0 | 2.5 | 6.0 | 3.0 | 54.25 |
| 21.0 | 21.0 | 2.5 | 6.0 | 3.0 | 43.97 |
| 20.0 | 18.0 | 2.0 | 6.0 | 3.0 | 30.20 |
| 19.0 | 17.0 | 2.0 | 6.0 | 3.0 | 27.46 |

| | | | |
|---|---|---|---|
| 220 | CS | W | SS | 90 |
| 200 | CS | W | SS | 90 |
| 180 | CS | W | SS | 90 |
| 160 | CS | W | SS | 90 |
| 140 | CS | W | SS | 90 |
| 120 | CS | W | SS | 90 |
| 100 | CS | W | SS | 90 |
| 300 | PP | WO | SS | 90 |
| 280 | PP | WO | SS | 90 |
| 260 | PP | WO | SS | 90 |
| 240 | PP | WO | SS | 90 |
| 220 | PP | WO | SS | 90 |
| 200 | PP | WO | SS | 90 |
| 180 | PP | WO | SS | 90 |
| 160 | PP | WO | SS | 90 |
| 140 | PP | WO | SS | 90 |
| 120 | PP | WO | SS | 90 |
| 100 | PP | WO | SS | 90 |
| 300 | MAT | WO | SS | 90 |
| 280 | MAT | WO | SS | 90 |
| 260 | MAT | WO | SS | 90 |
| 240 | MAT | WO | SS | 90 |
| 220 | MAT | WO | SS | 90 |
| 200 | MAT | WO | SS | 90 |
| 180 | MAT | WO | SS | 90 |
| 160 | MAT | WO | SS | 90 |
| 140 | MAT | WO | SS | 90 |
| 120 | MAT | WO | SS | 90 |
| 100 | MAT | WO | SS | 90 |

90 mph

FIG. 18B

Cable Section

Quantity: 12

Rad Center: 140 (FT)

Length: 165 (FT)

[Apply] [Cancel]

Conduit Section

Quantity: 4

Diameter: 3 ▼ (")

Length: 50 (FT)

Apply    Cancel

CellSite BudgetMaster
Cell Site Listing Report
10/9/2003 4:51:39 PM

Region: Central
Construction Manager: (ALL)

| Construction Manager | Region | Site Name | Site Number | Site Address | Tower Type | NewBuild Colo | Total Cost | Benchmark |
|---|---|---|---|---|---|---|---|---|
| Allen Vic | Central | monopole-model | 9110 | lee street , GA | Monopole Stack | Colo | $59,555.00 | $47,195.00 |
| Doug Pelletier | Central | Baldwin | 5451 | W. Church St./Sandy Baldwin, IL | Guyed Tower Stack | New Build | $8,250.00 | $8,252.00 |
| Doug Pelletier | Central | Pittsburg | 5901 | 302 S. Smelter Pittsburg, KS 66752 | Self-Support Stack | Colo | $26,703.00 | $28,674.00 |
| Jd Jones | Central | BTA Carve site acq, Multiple sites | 999999 | Central and East Texas Waco, Temple, Longview, TX | Monopole Stack | Colo | $8,738.00 | $9,120.00 |
| Jd Jones | Central | Grapevine Mills | 3981 | 3428 Anderson Gibson RD Grapevine, TX 75423 | Monopole Stack | Colo | $7,500.00 | $9,175.00 |
| Jd Jones | Central | Hwy 120/Magnolia | 4167 | 308B Bryan ST Pottsboro, TX 75076 | Monopole Stack | Colo | $6,785.50 | $9,643.00 |
| Doug Pelletier | Central | Evansville | 5453 | Evansville, IL | Guyed Tower Stack | New Build | $8,250.00 | $8,252.00 |
| Doug Pelletier | Central | Chester | 5400 | Chester, IL | Self-Support Stack | Colo | $53,089.75 | $43,381.00 |
| Doug Pelletier | Central | McBride | 4359 | McBride, MO | Self-Support Stack | New Build | $101,150.00 | $100,559.00 |
| Doug Pelletier | Central | Kimberling City | 5854 | Northwoods Ln./State Rd. 13 Kimberling City, MO | Guyed Tower Stack | New Build | $8,250.00 | $8,252.00 |
| Allen Vic | Central | Statesboro | 410-050 | , GA | Guyed Tower Stack | Colo | | |
| Allen Vic | Central | Downtown Augusta | 026-015 | , GA | Monopole Stack | Colo | | |
| Allen Vic | Central | Walton Way | 026-014 | , GA | Monopole Stack | Colo | | |
| Allen Vic | Central | Daniel Field | 026-001 | Augusta, GA | Monopole Stack | Colo | | |

CellSite BudgetMaster

Cell Site Listing Report
10/9/2003 4:51:39 PM

Region: Central
Construction Manager: (ALL)

| Construction Manager | Region | Site Name | Site Number | Site Address | Tower Type | NewBuild Colo | Total Cost | Benchmark |
|---|---|---|---|---|---|---|---|---|
| Doug Pelletier | Central | Lawrence Memorial | 4883 | 1114 West 6th Street Lawrence, KS 66044 | Monopole Stack | New Build | $78,779.37 | $46,534.00 |
| Doug Pelletier | Central | Bill's Test Site | 123 | St. Louis, MO | Monopole Stack | Colo | $23,802.50 | $24,119.00 |
| Lee Ann Fager | Central | Faulkner Lake | 9217 | , AR | Monopole Stack | Colo | $38,300.50 | $36,585.00 |
| Lee Ann Fager | Central | Holland/Enola | 9223 | , AR | Guyed Tower Stack | Colo | $5,500.00 | $8,240.00 |
| Lee Ann Fager | Central | Nash | 3517 | Enid, OK | Guyed Tower Stack | Colo | $26,637.50 | $42,731.00 |
| Lee Ann Fager | Central | Ashley | 3521 | Ashley, OK | Guyed Tower Stack | Colo | $89,568.05 | $42,731.00 |
| Doug Pelletier | Central | DP Test2 | 4231 | St. Louis, MO 63131 | Monopole Stack | Colo | $22,925.00 | $24,959.00 |
| Doug Pelletier | Central | Rick's Test Site | 1212 | St. Louis, MO | Monopole Stack | New Build | $1,000.00 | $70,440.00 |
| Lee Ann Fager | Central | Jet | 3518 | Jet, OK | Guyed Tower Stack | Colo | $25,587.50 | $41,440.00 |
| Lee Ann Fager | Central | Lambert | 3519 | Lambert, OK | Guyed Tower Stack | Colo | $0.00 | $42,731.00 |
| Lee Ann Fager | Central | Indian Creek | 2875 | Wynne, AR | Monopole Stack | Colo | $47,649.50 | $43,168.00 |
| Lee Ann Fager | Central | talihina | 8644 | talihina, OK | Guyed Tower Stack | Colo | $0.00 | $0.00 |
| Allen Vic | Central | 87788 | 444 | , TX | Self-Support Stack | New Build | $39,678.07 | $33,313.00 |
| Doug Pelletier | Central | Jerseyville DT | 5450 | Jerseyville, IL | Self-Support Stack | Colo | $54,899.75 | $45,719.00 |
| Lee Ann Fager | Central | Aline | 3527 | Aline, OK | Guyed Tower Stack | Colo | $26,637.50 | $42,731.00 |

CellSite BudgetMaster
Cell Site Listing Report
10/9/2003 4:51:40 PM

Region: Central
Construction Manager: (ALL)

| Construction Manager | Region | Site Name | Site Number | Site Address | Tower Type | NewBuild Colo | Total Cost | Benchmark |
|---|---|---|---|---|---|---|---|---|
| Lowell Jones | Central | Leslie | 2267 | Leslie, AR | Guyed Tower Stack | Colo | $26,499.50 | $26,540.00 |
| Lee Ann Fager | Central | New Site 1 | 2267 | , AR | Guyed Tower Stack | Colo | $26,215.88 | $26,540.00 |
| Allen Vic | Central | New Site 1 | 222 | , AR | Monopole Stack | New Build | $68,550.00 | $85,377.00 |
| Lee Ann Fager | Central | New | 3879 | , AR | Monopole Stack | Colo | $19,150.00 | $85,377.00 |
| Lee Ann Fager | Central | Creath | 2683 | , AR | Guyed Tower Stack | Colo | $1,300.00 | $1,442.00 |
| Doug Pelletier | Central | US65/Chestnut | 53305786 | Springfield, MO | Guyed Tower Stack | Colo | $1,000.00 | $1,442.00 |
| Doug Pelletier | Central | Riverdale | 53305760 | Riverdale, MO | Guyed Tower Stack | New Build | $8,250.00 | $8,252.00 |
| Doug Pelletier | Central | Spokane | 53305761 | Spokane, MO | Guyed Tower Stack | New Build | $8,250.00 | $8,252.00 |
| Lee Ann Fager | Central | Sunburst | 7405 | , OK | Monopole Stack | Colo | $14,200.00 | $17,850.00 |
| Doug Pelletier | Central | dp test 5 | 12348 | st louis, MO | Monopole Stack | New Build | $79,513.50 | $100,341.00 |
| Doug Pelletier | Central | dp test 6 | 12349 | st louis, MO | Self-Support Stack | New Build | $93,441.25 | $123,416.00 |
| Doug Pelletier | Central | dp test 7 | 12350 | st louis, MO | Guyed Tower Stack | New Build | $125,912.50 | $137,070.00 |
| Doug Pelletier | Central | Lick Creek | 98186224 | Lick Creek, IL | Self-Support Stack | Colo | $2,000.00 | $2,146.00 |
| Lee Ann Fager | Central | Union Pacific | 7405 | Muskogee, OK | Self-Support Stack | Colo | $33,722.77 | $38,831.00 |
| Doug Pelletier | Central | Structural Analysis - Dummy Site | 4321 | St. Louis, MO 63131 | Self-Support Stack | Colo | $1,100.00 | $1,566.00 |

CellSite BudgetMaster
Cell Site Report
10/9/2003 4:53:49 PM

| Construction Manager: | Allen Vic | | Site Address: | 123 anywhere, Atlanta, GA | | |
|---|---|---|---|---|---|---|
| Site Name: | Patent Demo | | Site Number: | 3 | | |
| Region: | Southeast | | County: | BAKER | | |
| NewBuild/COLO: | New Build | | Tower Type: | Self-Support Stack | | |
| | | | Tower Height: | 200 | | |

| Module | Vendor | Phone | Address | Discount | Vendor Cost | Benchmark |
|---|---|---|---|---|---|---|
| Geotechnical | ACME Geo Services | 281-807-1441 | 17314 Sh 249, Suite 230, Charlotte, NC | | $4,300 | $4,876 |
| Construction | BuildRight Contractors | 770-888-3264 | 1479 Ventura Drive, Miami, Fl | | $54,719 | $63,468 |
| | | | | | $59,019 | $68,344 |

CellSite BudgetMaster
Benchmark Analysis
10/9/2003 4:40:51 PM

Construction Manager: Allen Vic

Site Name: Patent Demo  Site Number: 3  Site Address: 123 anywhere, Atlanta, GA

Region: Southeast  County: BAKER

NewBuild/COLO: New Build  Tower Type: Self-Support Stack  Tower Height: 200

* Selected Vendor (SV)

Benchmark $63,468

Construction Module - Benchmark Vendors

| Vendor Name | Phone | Address | Module Cost |
|---|---|---|---|
| MBWE | | | |
| ABC Contractors | 724-885-1313 | 123 Any Road, New Bury, PA 16101 | $46,514.00 |
| DEF, Inc | 330-532-0000 | 456 Any Road Lima, Oh 44452 | $46,684.00 |
| GHI, Inc | 210-302-7765 | 789 Any Lane New Braunfels, TX 78131 | $49,175.00 |
| JKL, Inc | (409) 772-2222 | P.O. Box 123 Lumberton, Te 77657 | $49,365.00 |
| MNO, Inc. | (888) 899-3331 | 342 Any Circle, FL 33403 | $53,010.00 |
| PQR, Inc. | 305-666-6666 | 766 Any Drive Miami, Fl 33155 | $53,010.00 |
| *SV Economy Contractors | 770-888-4444 | 321 Any Street Cumming, GA 30040 | $54,719.00 |

Region: West Coast
Module: Site Acquisition

CellSite BudgetMaster
Vendor List
10/9/2003 4:55:41 PM

Site Acquisition Module

| Region | | Vendor Name | Address |
|---|---|---|---|
| Westcoast | | A. Owens & Associates, Llc | 3024 Montego Place |
| Westcoast | | Ac&S Engineering And Surveying, Inc. | 215 Whitsett Street |
| Westcoast | | Advanced Wireless Solutions, Inc. | 321 Old Gray Station Road, Suite 3 |
| Westcoast | F | Alcoa Wireless Services, Inc. Dba Afl Wireless Ser | 1455 Frazee Road, Suite 805 |
| Westcoast | | Allied Construction, Inc. | Po Box 700835. |
| Westcoast | | American Tower Corp. | 520 Butternut Dr, Suite 8 |
| Westcoast | | Applied Network Engineering | 419 Fieldstone Drive |
| Westcoast | | Arcadis Communications Const., Llc | 630 Plaza Drive - Suite 200 |
| Westcoast | | Archcomm, Inc. | 1840 Lockhill-Selma Rd. #101 |
| Westcoast | | Auburn Land & Energy Inc. | 4600 S. Garfield Road, Suite 300 |
| Westcoast | | B & C Contracting Co. | 4605 S. Orange Blossom Trail |
| Westcoast | T | B-C Walker Inc. | 7311 Kelly Ln |
| Westcoast | | Banton Construction Company, Inc. | 339 Washington Avenue |
| Westcoast | | Baran Telecom | 2355 Industrial Park Blvd. |
| Westcoast | | Bechtel / Wfi Corporation | 5295 Westview Drive |
| Westcoast | | Berliner Communications, Inc. | 97 Linden Ave. |
| Westcoast | | Bf Cellular Consulting, Llc | 724 Stonesign Drive |
| Westcoast | | Black & Veatch Corporation | 5119 Pineridge Drive |
| Westcoast | | Brookstone Telecom | 27450 Ynez Road Suite 300 |
| Westcoast | | Butler Telecom, Inc. | 9212 West Royal Lane |

CellSite BudgetMaster
Site Details
10/9/2003 4:57:32 PM

Construction Manager: Allen Vic
Site Name: Patent Demo
Site Number: 3
Address: 123 anywhere, Atlanta, GA 30075

| Module | Vendor | Description | Cost |
|---|---|---|---|
| Geotechnical | BuildRight Geo Services | NEPA | $500 |
| Geotechnical | BuildRight Geo Services | SHPO | $500 |
| Geotechnical | BuildRight Geo Services | Phase I Study | $1,600 |
| Geotechnical | BuildRight Geo Services | Soil Analysis | $1,700 |
| Construction | SkyHigh Contractors | Foundation | $12,040 |
| Construction | SkyHigh Contractors | Tower | $18,400 |
| Construction | SkyHigh Contractors | Megger Test | $450 |
| Construction | SkyHigh Contractors | Permitting | $515 |
| Construction | SkyHigh Contractors | Electrical | $600 |
| Construction | SkyHigh Contractors | Road | $774 |
| Construction | SkyHigh Contractors | IceBridge | $850 |
| Construction | SkyHigh Contractors | Shelter | $940 |
| Construction | SkyHigh Contractors | Antenna | $2,400 |
| Construction | SkyHigh Contractors | Conduit | $2,400 |
| Construction | SkyHigh Contractors | Antenna Sweep | $2,400 |
| Construction | SkyHigh Contractors | Compound | $3,500 |
| Construction | SkyHigh Contractors | Cable | $9,450 |

Construction Services Matrix

CONSTRUCTION / CONSTRUCTION RELATED SERVICES

If Not Applicable, please e-mail this sheet to Cingular with just your contact information.

| Vendor Name: | Type Name Here |
| --- | --- |
| Address: | Type Street Address Here |
| | Type City, State and Zip Here |
| Contact Name: | Type Contact Here |
| Tel. No 1: | Type Primary Phone # Here |
| Tel. No 2: | Type Backup Phone # Here |

| Activity Category | Activity Description | Regions | | | | | | | In-House / Farmed Out | Discount (>50 Sites) % | Vendor Comments |
| --- | --- | --- | --- | --- | --- | --- | --- | --- | --- | --- | --- |
| | | SouthEast | Great Lakes | NorthEast | West Coast | Central | Gulf Coast | | | | |
| Geotechnical / Environmental Module | Phase I Study - Ref SOW 2.3 | | | | | | | | | | |
| | Phase II Study - Ref SOW 2.4 | | | | | | | | | | |
| | Soil Analysis - Ref SOW 2.8 | | | | | | | | | | |
| | NEPA checklist - Ref SOW 2.1 | | | | | | | | | | |
| | SHPO study - Ref SOW 2.1 | | | | | | | | | | |
| | ASTM - Ref SOW 2.2 | | | | | | | | | | |
| | Arch Cultural Survey - SOW 2.5 | | | | | | | | | | |
| | Architectural Survey - SOW 2.6 | | | | | | | | | | |
| | Envir. Assess (EA) - SOW 2.7 | | | | | | | | | | |
| | Bundle Deal NEPA / ASTM / Phase I / SHPO Ref SOW 2.1 thru 2.3 | | | | | | | | | | |
| Construction Management Module | **Total Construction Mgmt. Bid Package, Awards, Materials Mgmt, Inspections / Walk Through / Assemblage of Completion Packages, Project Coordination / etc....Ref SOW 4.1 thru 4.6 | 15000.00 | | | | | | | | | |
| Architecture & Engineering Work Module Design Drawings | Issued For Construction* - Ref SOW 3.2 / 3.4 | | | | | | | | | | |
| | COLOCATION | | | | | | | | | | |
| | NEWBUILD - GUYED / SS | | | | | | | | | | |
| | NEWBUILD - MONOPOLE | | | | | | | | | | |
| | Issued For Permitting Only* Ref SOW 3.2 / 3.3 | | | | | | | | | | |
| | CO-LOCATION | | | | | | | | | | |
| | NEWBUILD - GUYED / SS | | | | | | | | | | |
| | NEWBUILD - MONOPOLE | | | | | | | | | | |
| | 2C Survey - Ref SOW 3.1 | | | | | | | | | | |
| | 1A Survey - Ref SOW 3.1 | | | | | | | | | | |
| | "As-Built" Drawings (from redlines) - Ref SOW 3.5 | | | | | | | | | | |
| Structural Analysis Module | Structural Analysis - Ref SOW 3.6 | | | | | | | | | | |
| Site Acquisition / Real Estate Module | Zoning - Administrative Only - Ref SOW 1.3.1 | | | | | | | | | | |
| | Zoning With Hearings-SOW 1.3.2 | | | | | | | | | | |
| | Leasing / Negotiation - SOW 1.2 | | | | | | | | | | |
| | Candidate search - SOW 1.1 | | | | | | | | | | |

Discount Applied if All 6 Modules Are Awarded (in %s)
Program Management Fee to be Applied if Awarded All 6 Modules

* includes grounding, electrical and survey drawings
** includes SHPO, FAA, FCC, permits, DOT, etc...

FIG. 35

Constructi n Matrix

CONSTRUCTION / CONSTRUCTION RELATED SERVICES

| Vendor Name: | Type Name Here |
|---|---|
| Address: | Type City, State and Zip Here |
| | Type City, State and Zip Here |
| Contact Name: | Type Contact Here |
| Tel. No 1: | Type Primary Phone # Here |
| Tel. No 2: | Type Backup Phone # Here |

If Not Applicable, please e-mail this sheet to Cingular with just your contact information.

| Activity Category | Units of Measure | Regions | | | | | | In-house/ Farmed out | Discount (>50 Sites) % | Vendor Comments |
|---|---|---|---|---|---|---|---|---|---|---|
| | | SouthEast | GreatLakes | NorthEast | WestCoast | Central | GulfCoast | | | |
| Construction Module | | | | | | | | | | |
| Road Construction : gravel (12' wide) | per linear foot - Ref SOW 5.2.1 | | | | | | | | | |
| Road Construction : paved (12' wide) | per linear foot - Ref SOW 5.2.2 | | | | | | | | | |
| Mobilization | incl in other costs - Ref SOW 5.3 | | | | | | | | | |
| Clearing : heavily wooded | per square foot - Ref SOW 5.4.1 | | | | | | | | | |
| Clearing : field | per square foot - Ref SOW 5.4.2 | | | | | | | | | |
| Permitting | Lump Sum - Ref SOW 5.1 | | | | | | | | | |
| 6' Caisson Drilling (WT at 4' or higher) | per linear foot - Ref SOW 5.5.1 | | | | | | | | | |
| 8' Caisson Drilling (WT at 4' or higher) | per linear foot - Ref SOW 5.5.1 | | | | | | | | | |
| 10' Caisson Drilling (WT at 4' or higher) | per linear foot - Ref SOW 5.5.1 | | | | | | | | | |
| 4' Caisson Drilling (WT at 4' or higher) | per linear foot - Ref SOW 5.5.1 | | | | | | | | | |
| 6' Caisson Drilling (WT below fdn) | per linear foot - Ref SOW 5.5.2 | | | | | | | | | |
| 8' Caisson Drilling (WT below fdn) | per linear foot - Ref SOW 5.5.2 | | | | | | | | | |
| 10' Caisson Drilling (WT below fdn) | per linear foot - Ref SOW 5.5.2 | | | | | | | | | |
| 4' Caisson Drilling (WT below fdn) | per linear foot - Ref SOW 5.5.2 | | | | | | | | | |
| General Concrete Pour (WT below fdn) | per cubic yard - Ref SOW 5.6.1 | | | | | | | | | |
| General Concrete Pour (WT above fdn) | per cubic yard - Ref SOW 5.6.2 | | | | | | | | | |
| Icebridge Supply / Install | per 10' length - Ref SOW 5.16 | | | | | | | | | |
| Monopole Stack | per linear foot - Ref SOW 5.7 | | | | | | | | | |
| Self-Support Stack | per linear foot - Ref SOW 5.8 | | | | | | | | | |
| Guyed Tower Stack | per linear foot - Ref SOW 5.9 | | | | | | | | | |
| Ground Ring for Shelter Sites | lump sum - Ref SOW 5.10 | | | | | | | | | |
| Ground Ring for Cabinet Sites | lump sum - Ref SOW 5.10 | | | | | | | | | |
| Cabinet Set (Include ancillary box) | lump sum - Ref SOW 5.11 | | | | | | | | | |
| Shelter Set - assume 12' x 24' : 50000 lbs) | lump sum - Ref SOW 5.12 | | | | | | | | | |
| Electrical hook-up (by Certified electrician) | lump sum - Ref SOW 5.11 / 5.12 | | | | | | | | | |
| Fence Install | per linear foot - Ref SOW 5.14 | | | | | | | | | |
| Megger Test | lump sum - Ref SOW 5.15 | | | | | | | | | |
| Antenna Install | per antenna - Ref SOW 5.16 | | | | | | | | | |
| Cable Install | per cable/per linear foot - SOW 5.16 | | | | | | | | | |
| Cable Sweeps | per cable - Ref SOW 5.17 | | | | | | | | | |
| 2" Diameter Conduit Run | per linear foot - Ref SOW 5.13 | | | | | | | | | |
| 2 1/2" Diameter Conduit Run | per linear foot - Ref SOW 5.13 | | | | | | | | | |
| 3" Diameter Conduit Run | per linear foot - Ref SOW 5.13 | | | | | | | | | |
| 4" Diameter Conduit Run | per linear foot - Ref SOW 5.13 | | | | | | | | | |

All prices include 50 miles of freight of materials

FIG. 36

CELLSITE BUDGETMASTER

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computers and to telecommunications and, more particularly, to an automated cell site design and vendor selection tool to optimize cell site design and planning and to minimize associated costs.

2. Description of the Related Art

Cellular Mobile Radiotelecommunications (CMR) has experienced explosive growth, and more growth is planned as access and numerous communication devices improve. In order to meet the demands of a rapidly growing market, mobile service providers must be able to design and put into service one or more cell sites within a very demanding time frame while also controlling construction and related service costs. The cost for construction of a cell site is very expensive, ranging from $80,000 to $500,000 or more. While this very expensive cost is commonplace, inefficient cell site planning and flawed bidding techniques nevertheless continue to be used. For example, the "norm" in the industry is to submit a proposed cell site design to three vendors to bid on the work, and usually the same three vendors bid on successive work. This lends itself to collusion and does not offer opportunities for "new blood."

There are three common tower designs used for erection of a cell site—monopole towers, self-supporting towers (also known as free-standing or "lattice" towers), and guyed towers. Monopole towers are constructed of tapered hollow tubes that symmetrically fit together and are stacked one on top of the other. Self-support towers are three- or four-sided structures that are constructed of steel cross-arm sections that increase in face width as they approach the ground like an elongated pyramid. Guyed towers are constructed of identical triangular steel cross arms of constant face width, usually in 20-foot sections, that are supported or "guyed" by tensioned support cables held in place by concrete anchors under and/or on the ground. The type of tower that is selected for a cell base station as well as the type of foundation to support the tower depends on a variety of factors, such as structural requirements, environmental conditions (e.g., wind speed, ice, etc.), tower height, governmental regulations, and company policies for the selected location. Typically, a cell site designer must have the necessary expertise and knowledge to select the tower design and construction (referred to herein as a "cell site plan."). Accordingly, the cell site designer needs to have familiarity with the location and the average weather conditions. In addition, the cell site designer needs to minimize costs associated with the cell site plan. As a standard practice, the costs are managed by requesting various vendors to bid on the scope of work defined in the cell site plan, and, then comparing and selecting a competitive bid. However, this approach depends upon participation of multiple vendors as well as requires significant, upfront analytical cell site design work to prepare the cell site plan.

There is, accordingly, a need in the art for improved systems and methods of cell site planning, a need for improved cell site design, and a need for improved vendor selection that minimizes and/or manages cell site construction costs.

BRIEF SUMMARY OF THE INVENTION

The aforementioned problems, and other problems, are reduced by methods and systems for cell site planning. This invention provides a cell site planning application and/or information system that allows a user to input initial cell site information. This invention, if desired, may also access historical cell site information for proposed cell site parameters to design and plan for a cell site. Once the cell site planning application and/or information system generates the proposed cell site design, the cell site application and/or information system accesses a database of vendor information including unitized billing/pricing and processes the vendor information with the proposed cell site design to determine a benchmark cost for the proposed cell site design and, if desired, to also generate a list of proposed vendors and each vendor's corresponding cost(s) for performing a service of the proposed cell site design. In an embodiment, the cell site planning application and/or information system only selects vendors that bid in a common geographic area and that include unitized billing/pricing for a service of the proposed cell site design. In further embodiments, this invention provides access to databases of historical cell site information (such as, for example, historical cell site designs, parametric calculations for tower type and foundation type, average geographic wind speeds required by the Electronics Industry Association (EIA) Code, and other cell site planning information) and of vendor information (such as, for example, vendor name and contact information, vendor costs for cell site services, user comments regarding customer satisfaction, whether the vendor offers any discounts or other incentives, and other vendor information). Thus, this invention automates cell site design and planning by using cell site design inputs and/or default cell site design parameters, calculates benchmark costs to efficiently gauge and manage cell site design and planning costs, and provides a list of applicable vendors/contractors with each vendor's cost to aid in the selection of and negotiations with a particular vendor.

According to embodiments of this invention, methods for cell site planning are disclosed. An initial cell site plan record is received, and, if needed or requested, an historic cell site plan record is accessed and retrieved. Then, a vendor record is accessed and associated with the initial cell site plan record and/or the historic cell site plan record to create a compiled cell site plan and billing record. The cell site plan and billing record specifies a proposed cell site design based on the initial cell site plan record and/or historic cell site plan record and also specifies a benchmark financial value for the proposed cell site design. That is, the benchmark financial value details the costs of building and/or of providing related services for the proposed cell site based on historical costs and on approximated costs associated with a standardized scope of work for the proposed cell site design. The initial cell site plan record, the historic cell site plan record, the vendor record, and/or the compiled cell site plan and billing record are maintained by a cell site planning information system.

Other embodiments provide for further methods. In another embodiment, the initial cell site plan record and/or the historic cell site plan record may be associated and matched with the vendor record of a common geographic area. For example, if a cell site identifier of the initial cell site contained a location parameter of Los Angeles, Calif., then only vendor records having a contractor identifier with a similar location parameter are associated and matched. That is, vendors in the California area are associated with the proposed cell site design and billing plan. In another embodiment, the initial cell site plan record and/or the historic cell site plan record are further associated with the vendor record to only match vendor records with a billing record for the standardized scope of work set forth for the proposed cell site design. For example, if a structural record of the initial cell site plan record is necessary, then only vendor records having a structural billing record for a standardized structural service are associated and matched. Vendors with no entry or with a "0" entry for the standardized structural service are not used in benchmark calculations nor are these vendors displayed to the user. According to further embodiments, after the vendor record is associated and matched, the cell site planning information system displays a list of matched vendor records in a user friendly format. For example, according to an embodiment, the vendor records may be organized and displayed by the contractor identifier, ranked from a lowest financial value to a highest financial value for the matched service of the proposed cell site design. Alternatively, the vendor records may be organized and displayed alphabetically by a name of the contractor identifier. Further, the vendor records may be organized and displayed for vendors bidding lower than the benchmark financial value, for all vendors (e.g., an exhaustive list of all vendors having a matched vendor records), and/or for a specific vendor identified by the contract identifier (e.g., name, address, etc.). Still further, other embodiments provide for comparing the financial value of the vendor records with the benchmark financial value of the proposed cell site design. For example, the matched list of vendors may highlight the benchmark financial value in a location proximate to a financial value of the vendor record so that the user can easily see how much the proposed design should reasonably cost and compare it to how much a particular vendor/contractor charges. And, if desired, the user could contact the vendor to discuss price differences and negotiate terms, conditions, and costs of the proposed cell site design. For example, if the vendor's price was higher than the benchmark financial value, then the user could discuss this with the vendor to understand why the vendor's cost is higher and to see if the vendor might discount his price to the benchmark financial value. If the vendor agrees to discount his price, then the user could update the applicable vendor record to supplant the applicable discounted billing record to meet the benchmark financial value.

Another of the embodiments of this invention describes a cell site planning information system that includes a cell site planning database and a cell site planning management application. The database maintains an historic cell site plan record and/or a vendor record. The historic cell site plan record includes an historic cell site identifier (e.g., name, address, and region), a parametric record (e.g., wind speed, tower type, and tower height), a construction record (e.g., gravel or paved road, clearing, permitting, drilling, concrete pour, fence install, cable install, etc.), an environmental record (e.g., Phase I study, NEPA compliance, ASTM, SHPO, etc.), a management record (e.g., inspections, scheduling, project co-ordination, etc.), an architectural record (e.g., survey, etc.), a structural record (e.g., structural analysis), and/or a site acquisition record (e.g., zoning, leasing, etc.). The vendor record includes a contractor identifier (e.g., name, address, region) and one or more billing records. These billing records include a construction billing record for a construction service (e.g., how much the vendor charges for building a gravel or paved road, etc.), an environmental billing record for an environmental service (e.g., how much the vendor charges for conducting a Phase I study, etc.), a management billing record for a management service (e.g., how much the vendor charges to provide construction management service), an architectural billing record for an architectural service (e.g., how much the vendor charges for a 2C survey, etc.), a structural billing record for a structural service (e.g., how much the vendor charges for structural analysis), and a site acquisition billing record for a site acquisition service (e.g., how much the vendor charges for zoning, etc.). Each billing record is "unitized" containing only distinct discrete unit pricing for a service that the cell site planning application and/or information system uses to derive the benchmark financial value for the proposed cell site design. For example, unit pricing may be stored as dollars per yard of concrete, dollars per foot of road, dollars per foot of cable or tower steel, and so on. Further, the cell site planning management application provides an interface with the cell site planning database and allows a user to input an initial cell site plan record that includes a cell site identifier, a new cell site parameter (i.e., cell site is new construction), a colocation parameter (i.e., cell site antenna will be added to existing structure), a water parameter (e.g., proximate water table to consider for foundation type), a parametric record, a construction record, an environmental record, a management record, an architectural record, a structural record, and a site acquisition record. Still further, the cell site planning application accesses the historic cell site plan record and/or the vendor record and associates the initial cell site plan record and/or the historic cell site plan record with the vendor record to create a compiled cell site plan and billing record. Thereafter, the cell site planning application creates and maintains a selected view (e.g., a graphical user interface of the proposed cell site design) associated with one or more compiled cell site plan and billing records. The cell site planning application provides means to establish, monitor, take action on, and report on the compiled cell site plan and billing record. For example, a user can create a new record, update one or more of the database records, monitor benchmark financial values of proposed cell site design with actual costs, select the contractor/vendor for the proposed cell site design, and/or generate reports. In addition, the cell site planning application supports online tasks and offline data maintenance and exchange, such as providing updated information to one or more peripheral databases.

Other systems, methods, and/or computer program products according to embodiments will be or become apparent to one with skill in the art upon review of the following figures and detailed description. It is intended that all such additional systems, methods, and/or computer program products be included within this description, be within the scope of this invention, and be protected by the accompanying claims.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein:

FIGS. 6-17 are pictures of Graphical User Interfaces (GUIs) according to embodiments of this invention;

FIGS. 18A-B are tables of parametric calculations for foundation sizes and types corresponding to tower heights and types at ninety miles per hour wind speed with water and without water according to embodiments of this invention;

FIGS. 19-29 are pictures of Graphical User Interfaces (GUIs) according to embodiments of this invention;

FIGS. 30-34 are generated reports according to embodiments of this invention.

FIGS. 35-36 are tables illustrating a vendor record according to embodiments of this invention.

DETAILED DESCRIPTION OF THE INVENTION

Figure 1:
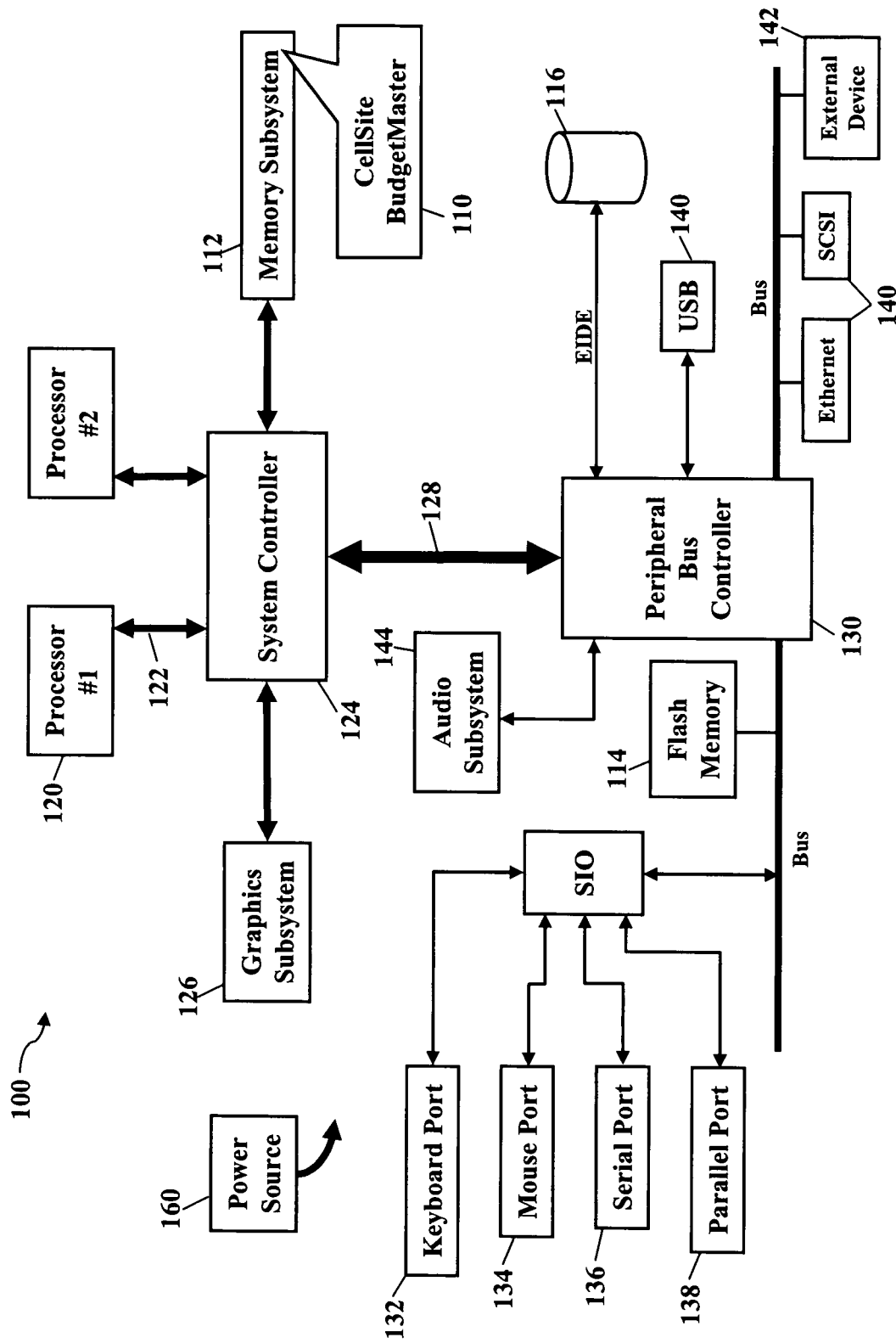
FIG. 1 is a block diagram showing a cell site planning and billing application (also referred to herein as a "CellSite BudgetMaster") that resides in a computer system according to embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides methods, systems, computer programs, and computer program products that automate cell site design and planning by using cell site design inputs and/or default cell site design parameters, by calculating benchmark costs to efficiently gauge and manage cell site design and planning costs, and by generating a list of applicable vendors/contractors with each vendor's cost to aid in the selection of and negotiations with a particular vendor. According to embodiments of this invention, a user interacts with a client workstation to logon and access a cell site planning application and/or a cell site planning information system that allows a user to input initial cell site data and, if desired, to access historical cell site data for proposed cell site parameters to design and plan for a cell site. Once the cell site application and/or information system generates the proposed cell site design, the cell site application and/or information system accesses a database of vendor data and integrates the vendor data with the proposed cell site design to determine a benchmark cost for the proposed cell site design. If desired, the cell site application and/or information system generates a list of proposed vendors and each vendor's corresponding cost(s) for performing a service of the proposed cell site design. The service, as described further below, may be performed for either all services of the module or for sub or partial services of the module. In further embodiments, this invention provides access to databases of the historical cell site data (such as, for example, historical cell site designs, parametric calculations for tower type and foundation type, geographic wind speeds required by the EIA Code, and other cell site planning information) and vendor data (such as, for example, vendor name and contact information, vendor costs for cell site services, user comments regarding customer satisfaction, whether the vendor offers any discounts or other incentives, and other vendor information). A more detailed description of these and other embodiments are described below with reference to the accompanying figures.

As used herein, the term "client workstation" includes wired and wireless communications devices, such as a mobile phone, a wireless phone, a Wireless Access Protocol (WAP) phone, a satellite phone, a personal computer (PC), a modem, a pager, a digital music device, a digital recording device, a personal digital assistant (PDA), an interactive television, a digital signal processor, and/or a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others. In various embodiments, the data may be stored by the client workstation, a peripheral storage device coupled with the client workstation, a network connected with the client workstation, and/or other connected networks.

Referring now to the figures, FIG. 1 is a block diagram illustrating a cell site planning management application referred to as a "CellSite BudgetMaster" application 110 (also referred to herein as "CellSite BudgetMaster" and "BudgetMaster"). The CellSite BudgetMaster 110 resides in a client workstation, shown as a personal computer 100. The CellSite BudgetMaster 110 operates within a system memory device. The CellSite BudgetMaster 110, for example, is shown residing in a memory subsystem 112. The CellSite BudgetMaster 110, however, could also reside in flash memory 114 and/or in a peripheral storage device, such as storage device 116. The personal computer 100 also has one or more central processors 120 executing an operating system. The operating system, as is well known, has a set of instructions that control the internal functions of the personal computer 100. A system bus 122 communicates signals, such as data signals, control signals, and address signals, between the central processors 120 and a system controller 124 (typically called a "Northbridge"). The system controller 124 provides a bridging function between the one or more central processors 120, a graphics subsystem 126, the memory subsystem 112, and a PCI (Peripheral Controller Interface) bus 128. The PCI bus 128 is controlled by a Peripheral Bus Controller 130. The Peripheral Bus Controller 130 (typically called a "Southbridge") is an integrated circuit that serves as an input/output hub for various peripheral ports. These peripheral ports could include, for example, a keyboard port 132, a mouse port 134, a serial port 136 and/or a parallel port 138. Additionally, these peripheral ports would allow the personal computer 100 to communicate with a variety of communications devices through Wired Comm Device Port 140 (such as, SCSI, USB, modem V90+, compact flash slots, Ethernet, and the like) and Wireless Transceiver 142 (such as, the IEEE Wireless standard 802.11, the Industrial and Scientific Band of the electromagnetic spectrum, and Infrared). The Peripheral Bus Controller 130 could also include an audio subsystem 144. Still further, the personal computer 100 may include a power source 160, such as a rechargeable battery, to provide power and allow the personal computer 100 to be portable. Those of ordinary skill in the art understand that the program, processes, methods, and systems described in this patent are not limited to any particular computer system or computer hardware.

The processor 120 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.microsoft.com). For example, an embodiment of this invention utilizes customized VisualBasic® queries associated with graphical user interfaces, MS Access® applications, MS Excel® spreadsheets, and MS Word® word processing applications to provide a suite of tools for CellSite Budgemaster 110. Other operating systems and programs, however, are also suitable. For example, such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.4010, www.apple.com). Those of ordinary skill in the art again understand that the program, processes, methods, and systems described in this patent are not limited to any particular operating system.

The system memory device (shown as memory subsystem 112, flash memory 114, and/or peripheral storage device 116) may also contain one or more databases and other application programs. For example, another application program may cooperate with the operating system and with a video display unit (via the serial port 136 and/or the parallel port 138) to provide a Graphical User Interface (GUI) for the CellSite BudgetMaster 110. The GUI typically includes a combination of signals communicated along the keyboard port 132 and the mouse port 134. The GUI provides a convenient visual and/or audible interface with the user of the personal computer 100. As is apparent to those of ordinary skill in the art, the selection and arrangement of the CellSite BudgetMaster 110 may be programmed over a variety of alternate mediums, such as, for example, a voice-activated menu prompt.

Figure 2:
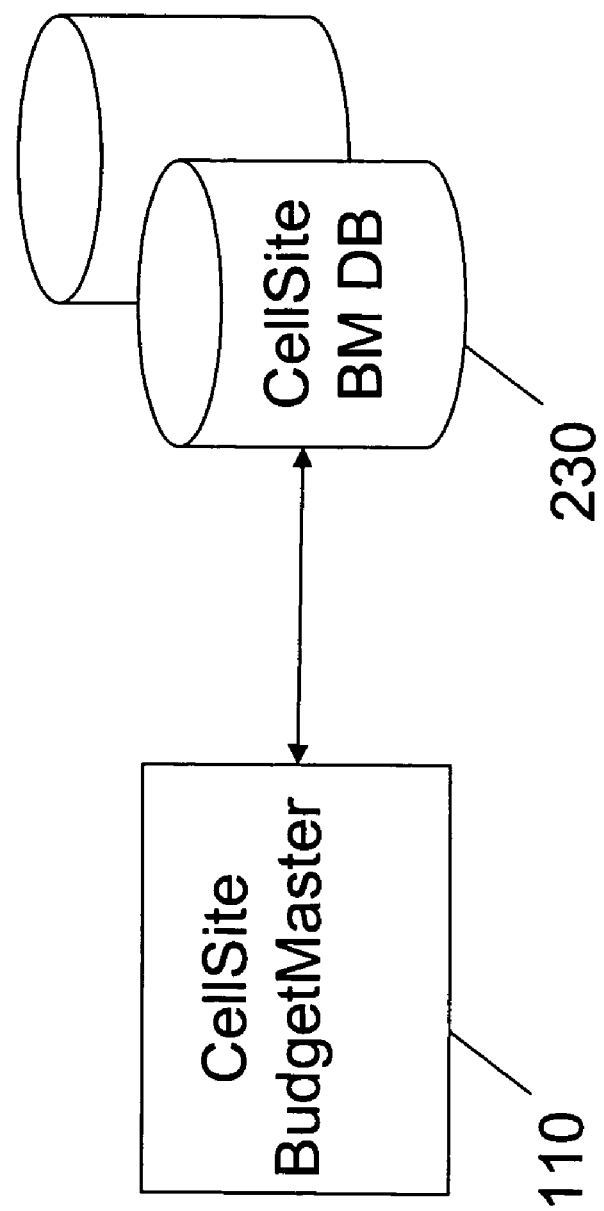
FIG. 2 is a schematic diagram of a two-tier cell site planning and billing computer network architect according to embodiments of this invention.
Figure 3:
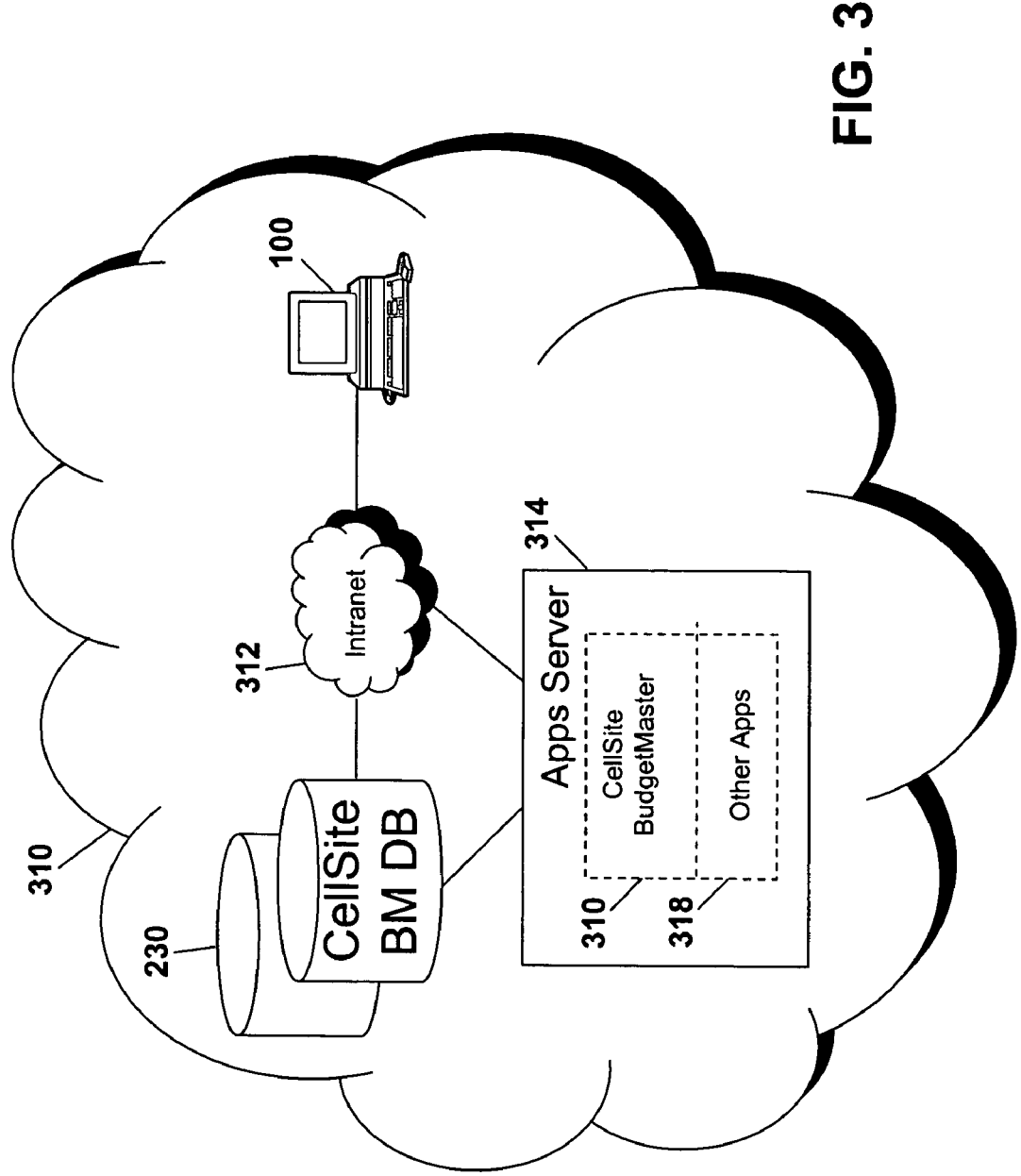
FIG. 3 is a schematic diagram of a three-tier cell site planning and billing computer network architect according to embodiments of this invention.
Figure 4:
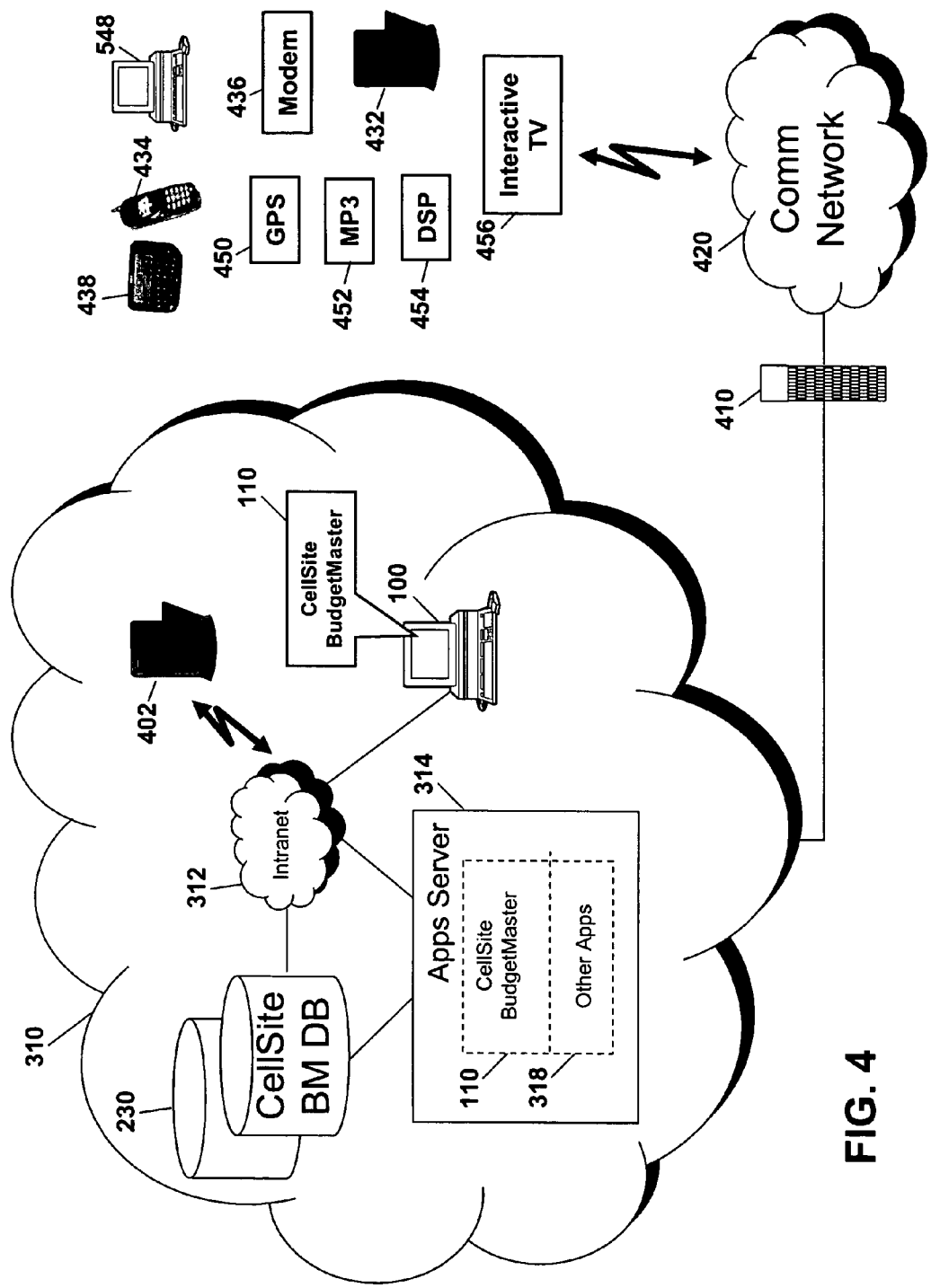
FIG. 4 is a schematic illustrating an overview of an exemplary operating environment of an online cell site planning and billing system (also referred to herein as a "CellSite BudgetMaster" system) according to embodiments of this invention.

As shown in FIGS. 2-4, a cell site planning information system may alternatively be based on a distributed, client/server architecture that supports object oriented technology, messaging, transactions, security, system management, and/or reporting. According to embodiments of this invention, a two-tier technical architecture consists of a client workstation operating with the CellSite BudgetMaster application 110 and a database server operating with a CellSite BudgetMaster database (referred to as "CellSite BM DB") 230 as shown in FIG. 2. According to other embodiments of this invention, FIG. 3 shows a three-tier technical architecture that operates over a private communications network 310. The private communications network 310 includes a client workstation shown as the personal computer 100, an intranet 312, an application serve 314, the CellSite BudgetMaster database 230 and database server. Typically, a user (e.g., a cell site designer) uses the personal computer 100 to access the CellSite BudgetMaster application 110 after logging onto the intranet 312 that controls access and manages assets of the private network 310. For example, the application server 314 may provide the CellSite BudgetMaster application 110 as well as other applications 318 over the intranet 312 to the personal computer 100. Alternatively, as shown in FIG. 4, the client workstation may be a stand alone device, or the client workstation may be integrated into a third party communications network. FIG. 4, for example, shows the client workstation as a personal digital assistant 432, a mobile phone 434, a modem 436, an interactive pager 438, a global positioning system 440, a digital media player 442 (such as an MP3/4 device), a digital signal processor 444, interactive television 446, and/or a stand alone computer 448. If a stand alone or third party workstation is used to gain access to private network 310, then the alternate workstation connects to private network 310 through a communications network 420 (e.g., digital subscriber line (DSL) via Public Switched Telephone Network (PSTN)) and a firewall 410. Whatever hardware and/or software of the client workstation, the client workstation provides a Graphical User Interface (GUI) for viewing and interacting with the CellSite BudgetMaster application 110. Further, the application server 314 and the database server for database 230 are multi-user computer systems, e.g., UNIX-based servers. Still further, it should be understood that multiple client systems and programs might be distributed throughout a network. Furthermore, several application servers running multiple applications may be located at various places, and multiple database servers and databases may be distributed as well. Those of ordinary skill in the art further understand that the exemplary operating systems, software, and hardware including the client workstation, private network components, and third party communications network described herein are for illustrative purposes and, this invention may be adapted for use with a variety of other operating systems, software, and hardware, and thus, are not intended to be limited to any particular technical architect.

Figure 5:
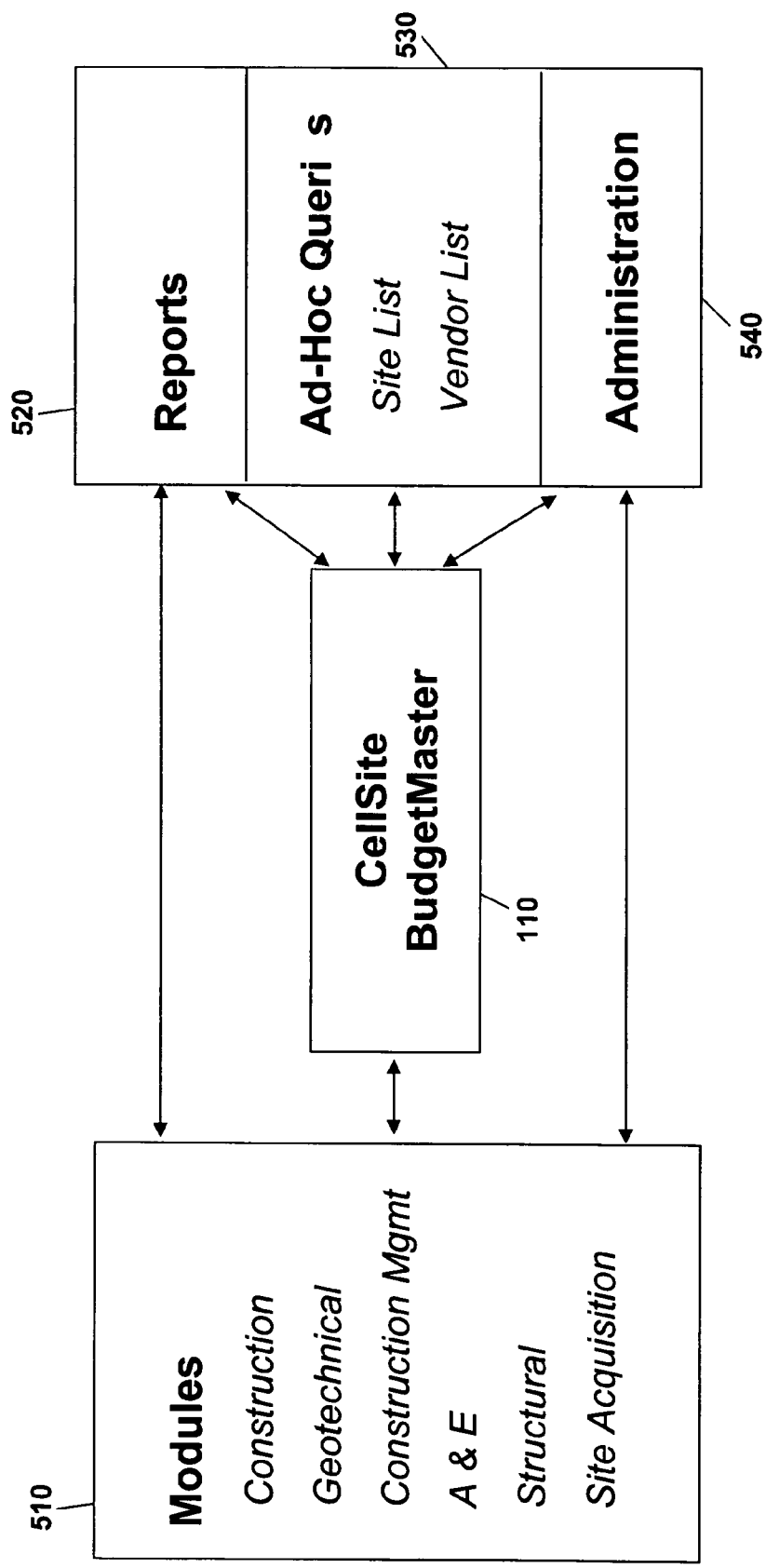
FIG. 5 is a schematic illustrating a logical view of modules, reports, ad-hoc queries, and/or administrative features of CellSite BudgetMaster according to embodiments of this invention.

FIG. 5 shows a model framework of cell site planning and/or billing tools available through CellSite BudgetMaster 110. These tools include modules 510 for designing new cell sites, reports 520 of cell site planning and/or billing data, ad-hoc query tools 530 to access historical cell site design data and/or vendor data, and administrative tools 540. The modules 510 represent computer program segments that a processor (e.g., processor 120 of FIG. 1) executes to generate a proposed cell site design and/or a benchmark financial value of the proposed cell site design. The computer program segments receive, access, retrieve, compile, generate, and/or otherwise manage data of an initial cell site plan record, an historical cell site plan record, a vendor record, and a compiled cell site planning and billing record. The initial cell site plan record includes data for a cell site identifier, a new cell site parameter, a colocation parameter, a water parameter, a parametric record, a construction record, an environmental record, a management record, an architectural record, a structural record, and/or a site acquisition record. The historic cell site plan is similar to the initial cell site record but stores data for existing cell sites or proposed cell site designs. Typically, the historic cell site plan records includes an historic cell site identifier, a parametric record, a construction record, an environmental record, a management record, an architectural record, a structural record, and/or a site acquisition record. The vendor record includes data for a contractor identifier, a construction billing record for a construction service, an environmental billing record for an environmental service, a management billing record for a management service, an architectural billing record for an architectural service, a structural billing record for a structural service, and/or a site acquisition billing record for a site acquisition service. Typically, the data of the vendor record is populated from inputs received from a vendor/contractor. The computer program segments then compile the initial cell site plan record, the historic cell site plan record, and/or the vendor record to generate a proposed cell site design and/or a benchmark financial value for the proposed cell site design. The compiled cell site planning and billing record may be generated for each module, a combination of modules, or all modules of the proposed cell site design.

These computer program segments are separated into six modules, that is, a Construction module, a Geotechnical module, a Construction Management (referred to as "Construction Mgmt") module, an Architectural & Engineering (referred to as "A&E") module, a Structural Analysis module, and a Site Acquisition module. It can be appreciated, however, that the functions performed by these modules can be further separated into more modules, combined together to form less modules, and/or be distributed throughout the system, and still fall within the scope of this invention. The operation of these tools will now be described in further detail with reference to FIGS. 6-22.

Figure 6:
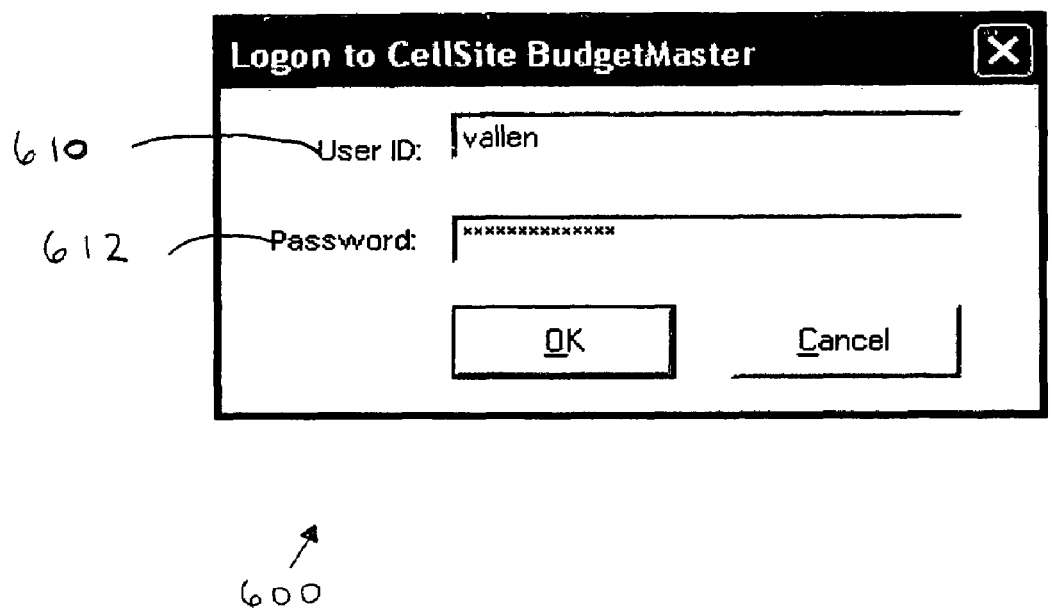
Figure 7:
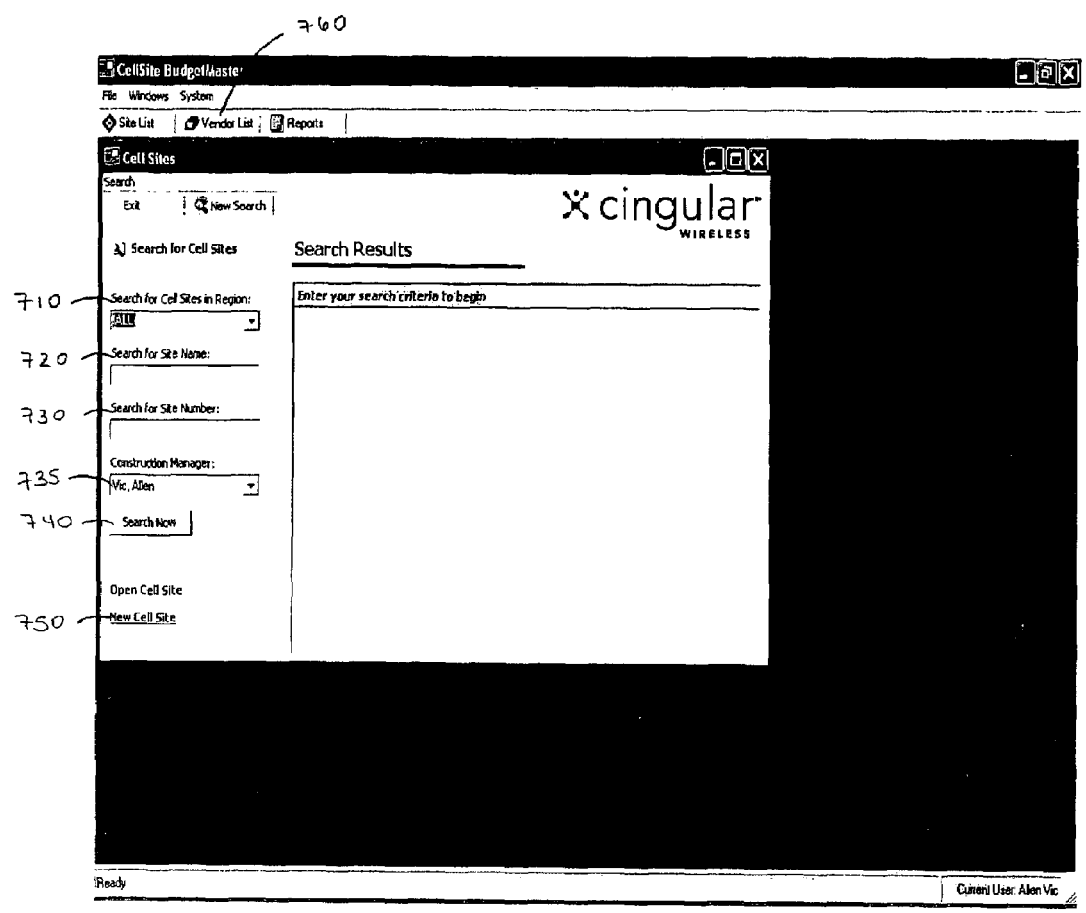

FIG. 6 illustrates an exemplary CellSite BudgetMaster entry screen 600 for the user to input his/her "User ID" 610 and "Password" 620. Thereafter, the user navigates to a "Cell Sites" screen 700 of FIG. 7, and the user may either (1) input a search term for an ad-hoc query of an historical cell site plan record, (2) select a new cell site prompt for cell site planning, (3) access a vendor record, and/or (4) generate a report. The ad-hoc query of the historic cell site plan record may be implemented by either using a "Search for Cell Sites in Region" pull-down menu 710, by receiving an input for a "Search for Site Name" prompt 720, by receiving an input for a "Search for Site Number" prompt 730, or by receiving an input for a "Construction Manager" prompt 735 to view historic cell site plan record associated with the construction manager (i.e., previous user). Thereafter, a "Search Now" button 740 is activated and the ad-hoc query is run to identify one or more cell sites that match the user input(s). If, however, the user wants to design a new cell site, then the user activates a "New Cell Site" prompt 750 displayed in a lower left hand corner to navigate to a "New Site 1" screen 800 of FIG. 8. The "Location Information" screen 805 is displayed and the user is prompted to enter data for an initial cell site plan record that includes a cell site identifier, such as a "Site No." identifier 810, a "Name" identifier 812, an "Address" identifier 814, a "City" Identifier 816, a "State" identifier 818, a "Zip" identifier 820, a "Region" identifier 830 from a pull-down menu, a "County" identifier 832 from a pull down menu, and user "Comments" 860. If needed, CellSite BudgetMaster 110 uses the County identifier 832 input of the initial cell site plan record to associate a wind speed of the historic cell site plan record. More specifically, the historic cell site plan record includes the EIA Code for required design wind speeds matched with the County identifier 832. The user is also prompted to identify a "Type" identifier 840 to specify if the new cell site to design is a new cell site ("New Build") or is a colocation ("Colo"). And, finally, the user is provided a pull-down menu for a "Tower" identifier 842 and may specify if the new cell site is a monopole, self-support, or guyed tower. However, the user does not have to specify a tower and, consequently, CellSite BudgetMaster 110 will select the Tower based on the initial cell site plan record, an historical cell site plan record, and/or a vendor record. The process of selecting the Tower is well-known in the art, so this patent will not further discuss the selection criteria. If, however, the reader desires more information on Tower characteristics, advantages, and disadvantages, then the reader is invited to consult: PAUL BEDELL, CELLULAR/PCS MANAGEMENT A REAL WORLD PERSPECTIVE 52-63 (1999), of which is incorporated herein by reference.

After inputting some of the initial cell site parameters, the user must then select the modules for the new cell site design. The modules are initially displayed in a "Main" view 870 with a pull-down "View" menu 865 to navigate and view the Main view 870 summarizes all six modules or to navigate to one of the six modules for more detailed data of each module. The Main view 870 is positioned proximate to the Location Information view 805 that is populated with the initial cell site plan record. The six modules are accessed by selecting one of a "Site Acquisition" prompt 880, a "Geotechnical" prompt 882, an "A and E" prompt 884, a "Structural" prompt 886, a "Construction Mgmt." 888 prompt, and a "Construction" prompt 890. Each module of the proposed cell site design further identifies one or more standardized scope of services that can either be selected by the user or be set as a default for the proposed cell site design. These standardized scopes of services for each module are specified in further detail in Tables 1-6 below. The defaults are automatically activated when CellSite BudgetMaster receives the initial cell site plan record and associates historical cell site plan records and/or vendor records as the user navigates through a module. These defaults will be further explained below. After a proposed cell site design is generated, the Main view 870 displays a selected "Contractor" 872, a "Module Cost" 874, and a "Benchmark" 876 for each applicable module of the proposed cell site design. And, the Main view further displays a "Total Module Cost" 892 having a total financial value for the services of all modules required for the proposed cell site design and a "Total BenchMark Cost" 894 having a total financial value for all benchmark financial values of all modules required for the proposed cell site design. In addition, if the user wants to specify a Turnkey Vendor Selection, that is, to specify that all of the work for each of the modules of the proposed cell site design is performed by one vendor, then the user may select a "Turnkey Vendor Selection" prompt 896 to only select vendors that provide services for every module of the proposed cell site design.

Figure 9:
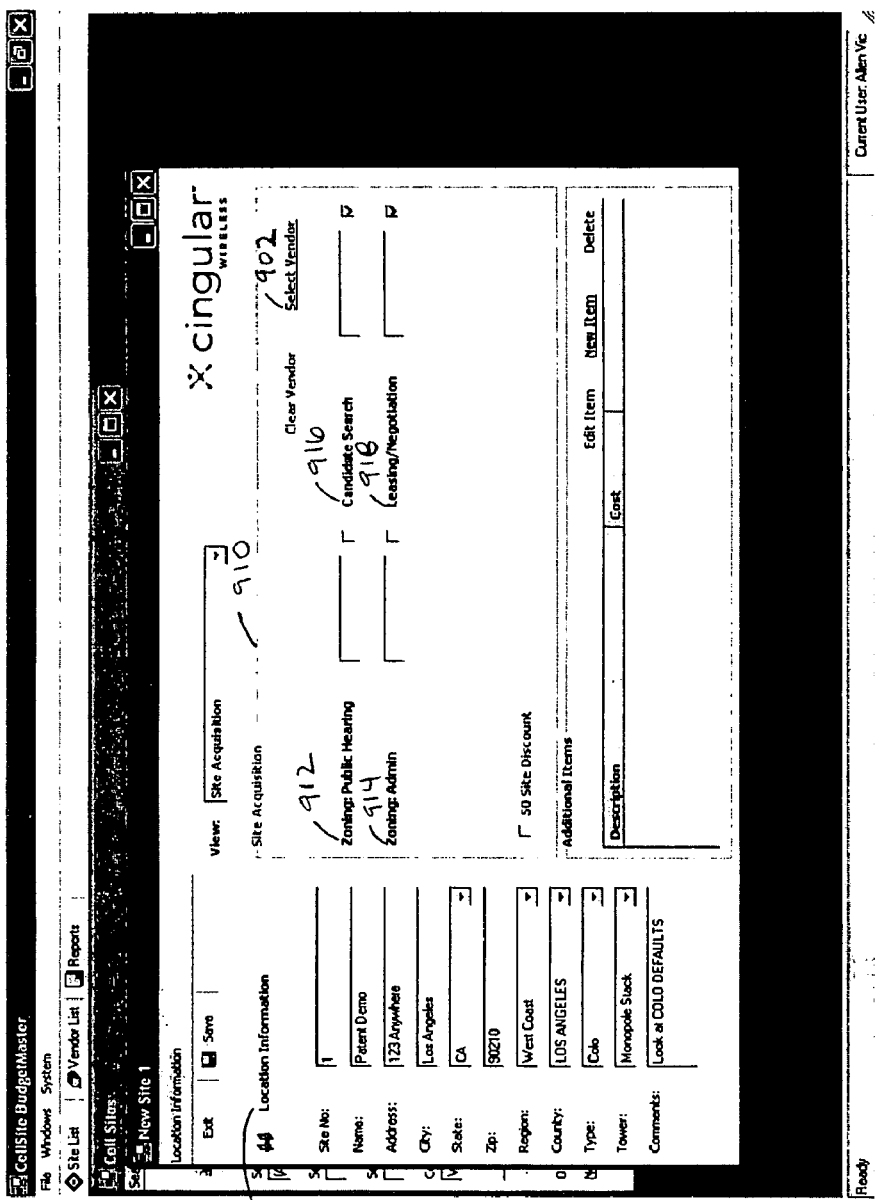

Referring now to each module, the Site Acquisition services include preliminary planning, identifying candidate sites, assisting in negotiation with potential lessors, and/or securing lease(s) for the cell site land. Theses services may also require the contractor/vendor to coordinate any required testing, such as, but not limited to drive tests, environmental assessments, geotechnical reports, structural analysis, and/or others as required. If the user selects the Site Acquisition prompt 880, then a "Site Acquisition" view 910 of FIG. 9 is displayed proximate to the Location Information view 805 that is populated with the initial cell site plan record. The Site Acquisition view 910 identifies four Site Acquisition services that may be performed for the proposed cell site design. These services are displayed as a "Zoning: Public Hearing" prompt 912, a "Zoning: Admin" prompt 914, a "Candidate Search" prompt 916, and a "Leasing/Negotiation" prompt 918. The scopes of services for these prompts are set forth in Table 1 below. Further, CellSite BudgetMaster 110 uses business rules understood by those of ordinary skill in the art to automatically select the Candidate Search prompt 916 and the Leasing/Negotiation prompt 918 all because the initial cell record identified the Type 840 as a "Colo." However, the user may de-select a defaulted prompt(s) (here the defaults are 916 and 918) and control selection of a prompt that correspond to the service needed for the Site Acquisition of the proposed cell site design. CellSite BudgetMaster 110 calculates a benchmark financial value of the proposed cell site design for each module depending on which prompts are selected for services of that module.

TABLE 1

Standardized Scope of Work for Site Acquisition Services

| Service | Standardized Scope of Work for Service |
| --- | --- |
| Zoning: Public Hearing | File all application forms with the applicable municipal authority. Prepare all presentation material for the zoning process such as PowerPoint presentations, photosimulations, etc. Perform any testing identified by the applicable municipality such as a balloon test. Coordinate with Company and the applicable A&E firm to produce site plans or construction drawings as required for successful zoning. Provide copies of all zoning approvals to Company. Contractor will support an unlimited number of public hearings. Contractor will be available to provide expert testimony. Contractor will post all public hearing announcements or results (usually newspaper) set forth by the applicable municipality. |
| Zoning: Admin | File all application forms with the applicable municipal authority. Prepare all presentation material for the zoning process such as PowerPoint presentations, photosimulations, etc. Perform any testing in accordance with the applicable municipality such as a balloon test. Coordinate with Company and the applicable A&E firm to produce site plans or construction drawings for successful zoning. Provide copies of all zoning approvals to Company. |
| Candidate Search | Drive Search Area. Supply Site Candidate Information Package (SCIP) for at least 3 candidates that meet Company's criteria. Candidates should be selected based on adherence to RF design criteria, lease feasibility, feasibility of obtaining necessary jurisdictional approvals, and ease and cost of construction. For each candidate that Company denies, Company has the option of requiring Contractor to submit a new candidate at no additional cost to Company. SCIP form to be provided by Company (SCIP will include information related to the description of the site, including its location and a site location map as well as property ownership information). Provide, as part of SCIP, attachments such as photographs from all four directions (N. E. S. & W.), a close-up of candidate, and a distant view towards candidate; site location map; Assessor's Parcel Map. Identify every competitor tower and colocation opportunity within the search area and within view of the search area. Provide location of other carriers on the site, if any. Include preliminary zoning analysis of jurisdictional zoning processes to determine the feasibility of zoning approvals. Recommend the site that best meets the system design requirements, leasing objectives, construction parameters, offers land use compatibility and that should be pursued for a lease agreement. Coordinate Site visit with owner and Company representatives. Site visit to include Site Development, RF Engineering, Zoning, and Construction. Provide weekly reports of site acquisition status; all SCIPs |

TABLE 1-continued

Standardized Scope of Work for Site Acquisition Services

| Service | Standardized Scope of Work for Service |
|---|---|
| | should be delivered within 2 weeks of receiving search area map. |
| Leasing/Negotiation | Negotiate with property owner to secure a Company approved lease for the primary site.<br>Lease red lines must be accompanied by a review sheet statin changes to the standard document, if any, and owner's intent.<br>All business terms must be approved by Company Site Development before being included in lease.<br>All Legal terms must be approved by Company legal counsel before being included in lease.<br>Provide 4 copies of agreements executed by landowner after route sheet (form to be provided by Company) has been approved.<br>Provide hard and soft copies of a completed Real Estate Site Report (form to be provided by Company) including the following information: |

Title Report and Insurance if required
ASTM completed by owner
Signed W-9 from owner
Copy of existing survey, plat map, or drawing of property
Copy of owner's Warranty Deed
Attornment and Non-Disturbance agreement
Contract and zoning information
City zoning maps and site locator map
Memorandum of Lease (to be filed by Contractor)
Photographs of site, including ones usable for renderings
Access and Utility Easements (must be approved by
Company before execution). Telco & power utility
providers may require easements directly from
property owner. Provide telephone company standard
easement document to owner for signature.
Coordinate with Company Real Estate / Construction
Dept.
Coordinate with property owner or property manager to
execute an Entry and Testing Agreement, if required.
Assist in curing any defects with the title report.
Meet surveyor at site with representative of Company Real
Estate or Construction Dept to verify site layout.
Review completed surveys for accuracy and completeness
before giving to Construction.
Support the zoning process by providing information as required.
Attend build meetings and provide weekly status.
If the site is a colocation, Contractor will also be expected to
provide the following:

Submit a colocation application to the tower owner
(application fee is to be paid by Company). Obtain a
2C tolerance survey for latitude, longitude and ground
elevation and a 1A tolerance survey for height if
available from tower owner (a 1A tolerance survey for
all data is also acceptable). For locations not having
pre-existing 2C surveys, a new 1A survey, to be paid
for by Company, is required.
Provide all NEPA related information from the structure
owner if available.
Provide a copy of the clearance from the State Historic
Preservation Office (SHPO) from the tower owner if a
tower was constructed after Mar. 16, 2001.
Have structure owner sign Company FAA/SHPO
tower structure compliance certification in connection
with NEPA & SHPO requirements. (Company to provide form).
Provide a copy of FAA Forms 7460 and 7460-1, if applicable.
Provide a copy of FCC Forms 854 and 854R, if applicable.
Provide verification that the FCC Tower Registration
number has been posted at the site and is easily
readable on both the driveway entry gate and the tower
compound gate (if applicable).
Verify the type of FAA marking and lighting on the
structure, if applicable.
Provide a copy of the most recent construction
drawings (to include tower manufacturing drawings) as
well as the most recent structural analysis, if available.
Electronic format is preferred. If electronic format is TABLE 1-continued Standardized Scope of Work for Site Acquisition Services

| Service | Standardized Scope of Work for Service |
|---|---|
| | not available, a hard copy shall be provided. This data will be forwarded to the A&E firm for their use in developing drawings for the site. |

Figure 10:
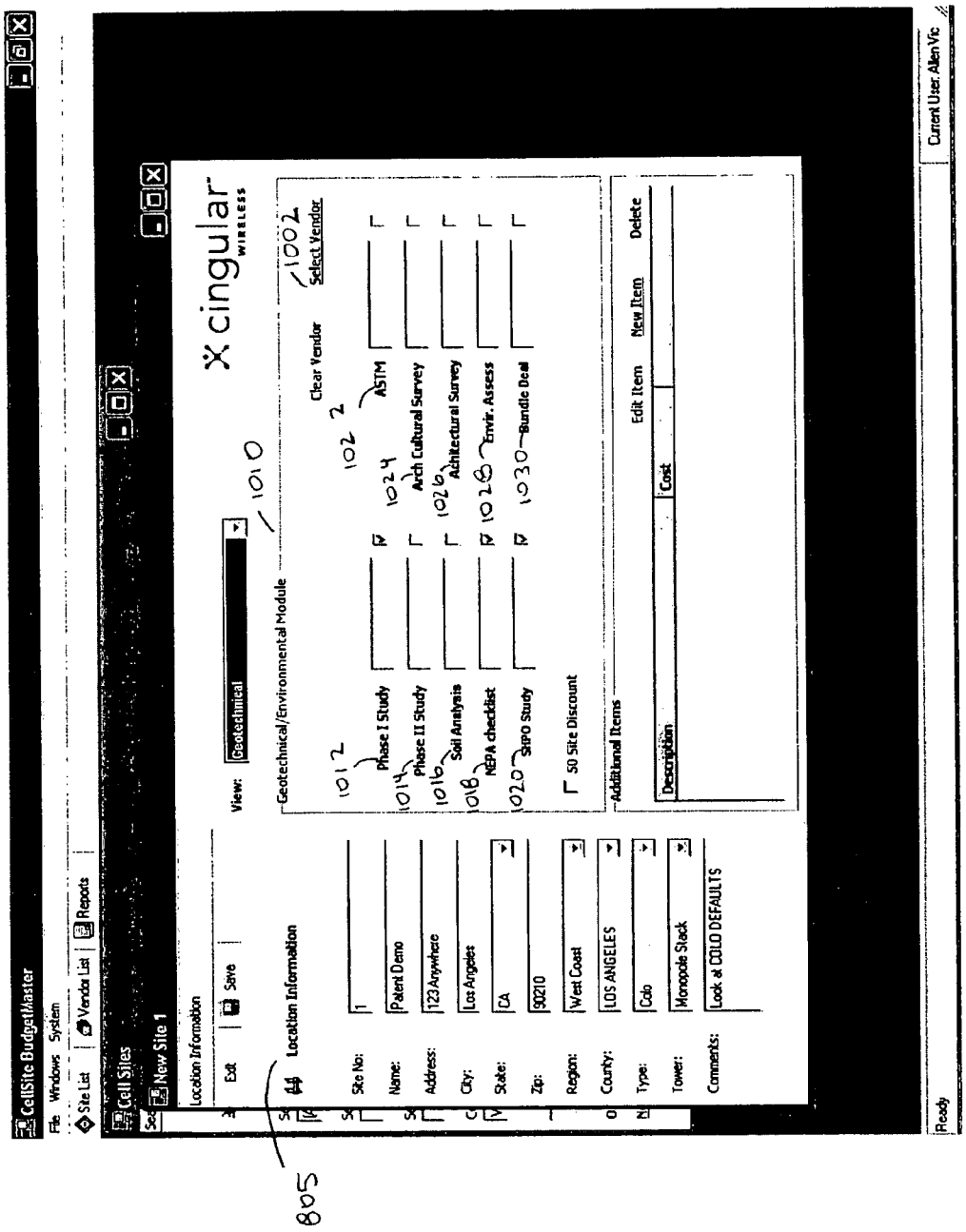

Referring now to the Geotechnical services, these services are for environmental compliance with local, state, and federal regulations. If the user selects the Geotechnical prompt 882, then a "Geotechnical" view 4010 of FIG. 10 is displayed proximate to the Location Information view 805 that is populated with the initial cell site plan record. The Geotechnical view 4010 identifies ten Geotechnical services that may be performed for the proposed cell site design. These services are displayed as a "Phase I Study" prompt 1012, a "Phase II Study" prompt 1014, a "Soil Analysis" prompt 1016, a "NEPA checklist" prompt 1018, a "SHPO Study" prompt 1020, an "ASTM" prompt 1022, an "Arch Cultural Survey" prompt 1024, an "Architectural Survey" prompt 1026, an "Envir. Assess" prompt 1028, and a "Bundle Deal" prompt 1030. The scope of services for these prompts are set forth in Table 2 below. Further, CellSite BudgetMaster 110 uses business rules understood by those of ordinary skill in the art to automatically select the Phase I Study prompt 1012, the NEPA checklist prompt 1018, and the SHPO Study prompt 1020 since the initial cell record identified the Type 840 as a "Colo." However, the user may de-select a defaulted prompt (here the defaults are 1012, 1018, and 1020) and control selection of a prompt that corresponds to the service needed for the Site Acquisition of the proposed cell site design.

TABLE 2

Standardized Scope of Work for Geotechnical Services

| Service | Standardized Scope of Work for Service |
|---|---|
| Phase I Study | Complete a Phase I Environmental Site Assessment in accordance with the ASTM E-1527 Standard Practice, including: |
| | Complete site inspection by qualified personnel. Include a summary document. Include site photographs. Include aerial photographs. Include USEWS wetlands map, FEMA map, and USGS topographic map. Include state and federal records and environmental database radius report. Include compilation of appropriate local, state, and federal agency documentation. Include owner and appropriate agency interviews. Include assessment of 50-year chain-of-title. Submit one bound and one unbound copy of the report to Company. |
| Phase II Study | Complete a Phase II soil test per Company direction based upon the conclusions reached in the Phase I report, including: |
| | Have soil samples taken from the site by qualified personnel. Have soil tested by reputable, qualified environmental testing laboratory. Prepare report that includes written analysis from laboratory with results of contamination levels, and conclusions as to risk level or proceeding with construction at a specific site. |
| Soil Analysis | A geotechnical exploration will be performed for each raw land site. The objective is to develop information about the site and subsurface conditions and to provide general foundation recommendations for the proposed facility, including: |
| | Perform reconnaissance of the site by the drill crew. Have underground utilities located prior to starting exploration. Mobilize staff and equipment to site. Complete soil borings as described below. Drill one 50-foot deep soil test boring (ASTM D 1586) for proposed self supported & monopole towers, and one (1) 30' deep boring at guyed tower location and (1) 30' boring at guy anchor location designated by client. Perform Standard Penetration Test (SPT) resistance testing on 2 ½ foot centers for the top 10 feet of the boring and on 5-foot centers for the remainder of the boring. Obtain "undisturbed" Shelby tube samples, if appropriate, for potential laboratory testing. |

TABLE 2-continued

Standardized Scope of Work for Geotechnical Services

| Service | Standardized Scope of Work for Service |
| --- | --- |
| | Stratify subsurface conditions within depth of boring(s). Collect water level measurement(s) prior to backfilling borehole(s) and include depth below grade to water table at time boring was taken. Provide general recommendations for foundation type. Prepare field-drilling logs with descriptions by layer of soil classification characteristics (SPT resistance values), ground water observations, and RQD and recovery values for rock core for each boring. Provide 5 each 8 ½ × 11 Geotechnical Report. Due 10 business days from NTP. |
| NEPA checklist | Completion of Section 106 Process, including: |
| | Complete site inspection by qualified personnel. Complete a copy of the NEPA Checklist. Include a summary document. Include site photographs. Include USEWS wetlands map, FEMA map, and USGS topographic map. Send and include copies of letters to all appropriate State and Federal agencies, including but not limited to the USF&WS, state conservation offices, state historic preservation offices (SHPO), and appropriate Indian Tribes. Include viewshed information to the SHPO, along with a research-based opinion (by an historian with qualifications acceptable to the applicable SHPO) of "No Affect," "No Adverse Effect," or "Adverse Effect." Include responses from each State and Federal agency and Indian Tribe. Calculate the APE and check all appropriate sources for historic buildings/districts that are eligible for listing on the National Register. Include photographs of any historic structures within the APE and photographs from the historic site looking towards the potential cell site. Submit one bound and one unbound copy of the NEPA Checklist, photographs, letters, and maps to Company. |
| SHPA Study | Completion of Section 106 Process, including: |
| | Complete site inspection by qualified personnel. Complete a copy of the NEPA Checklist. Include a summary document. Include site photographs. Include USFWS wetlands map, FEMA map, and USGS topographic map. Send and include copies of letters to all appropriate State and Federal agencies, including but not limited to the USF&WS, state conservation offices, state historic preservation offices (SHPO), and appropriate Indian Tribes. Include viewshed information to the SHPO, along with a research-based opinion (by an historian with qualifications acceptable to the applicable SHPO) of "No Affect," "No Adverse Effect," or "Adverse Effect." Include responses from each State and Federal agency and Indian Tribe. Calculate the APE and check all appropriate sources for historic buildings/districts that are eligible for listing on the National Register. Include photographs of any historic structures within the APE and photographs from the historic site looking towards the potential cell site. Submit one bound and one unbound copy of the NEPA Checklist, photographs, letters, and maps to Company. |
| ASTM | Complete the Transaction Screen Questionnaire in accordance with the ASTM E-1528 Standard Practice and investigate and determine the current and past operations and conditions at the property being considered for acquisition or lease, which may have had or may have an adverse environmental impact on the site and/or a business environmental risk, including: |
| | Complete site inspection by qualified personnel. Include a summary document. Include site photographs. Include USGS topographic figure. Include state and federal records and environmental database radius report. |

TABLE 2-continued

Standardized Scope of Work for Geotechnical Services

| Service | Standardized Scope of Work for Service |
|---|---|
| Arch Cultural Survey | Include ASTM E-1528 Transaction Screen Questionnaire completed by property owner and consultant. Include Company-provided Environmental Assessment Evaluation. Submit one bound and one unbound copy of the report to Company. Complete a NHPA Section 106 Cultural Resources Investigation, Phase I Archaeology Survey, including: |
| Architectural Survey | Include a satisfactory site investigation by a 36 CFR 61-qualified professional archaeologist. Include one bound and one unbound copy of a summary report per state and federal requirements. Complete a NHPA Section 106 Cultural Resources Investigation, Architectural Survey of all structures within the APE as applicable per state requirements, including: |
| Environmental Assess | Include an assessment of visual effect on identified NRHP-eligible and NRHP-listed architectural properties by an historian with qualifications acceptable to the applicable SHPO. Complete the FCC-mandated Environmental Assessment per Company guidelines, including: |
| Bundle Deal | Include a summary document containing a description of NEPA process applicability to site, site description, zoning and public controversy statement, alternatives analysis, applicable maps and facility site plan, NEPA checklist, photographs, applicable permits and letters, agency permits and approvals, interviews, summary statement, and qualifications of consultants. Includes services for NEPA checklist, ASTM, Phase I Study, and SHPO Study |

Figure 8:
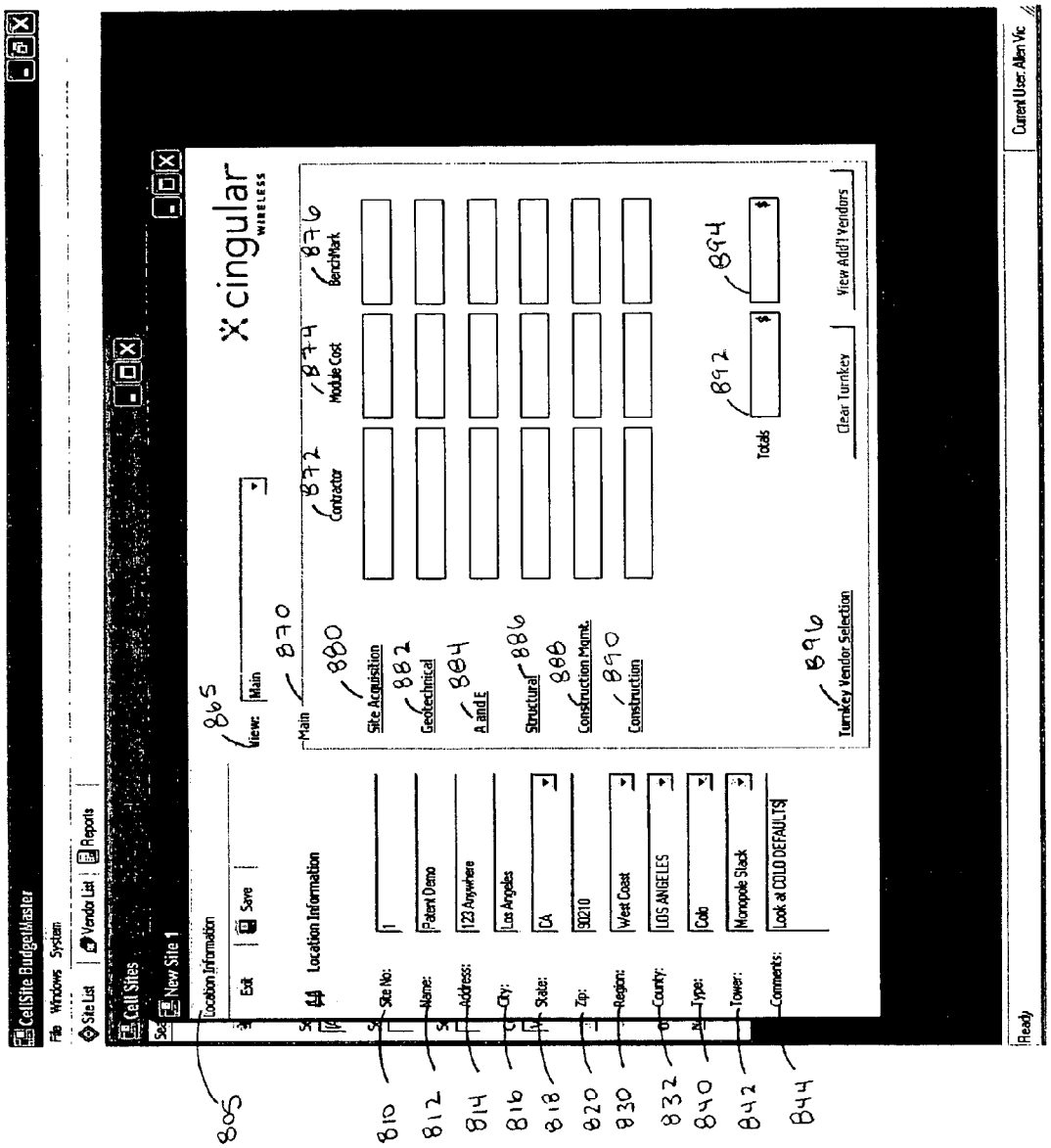
Figure 11:
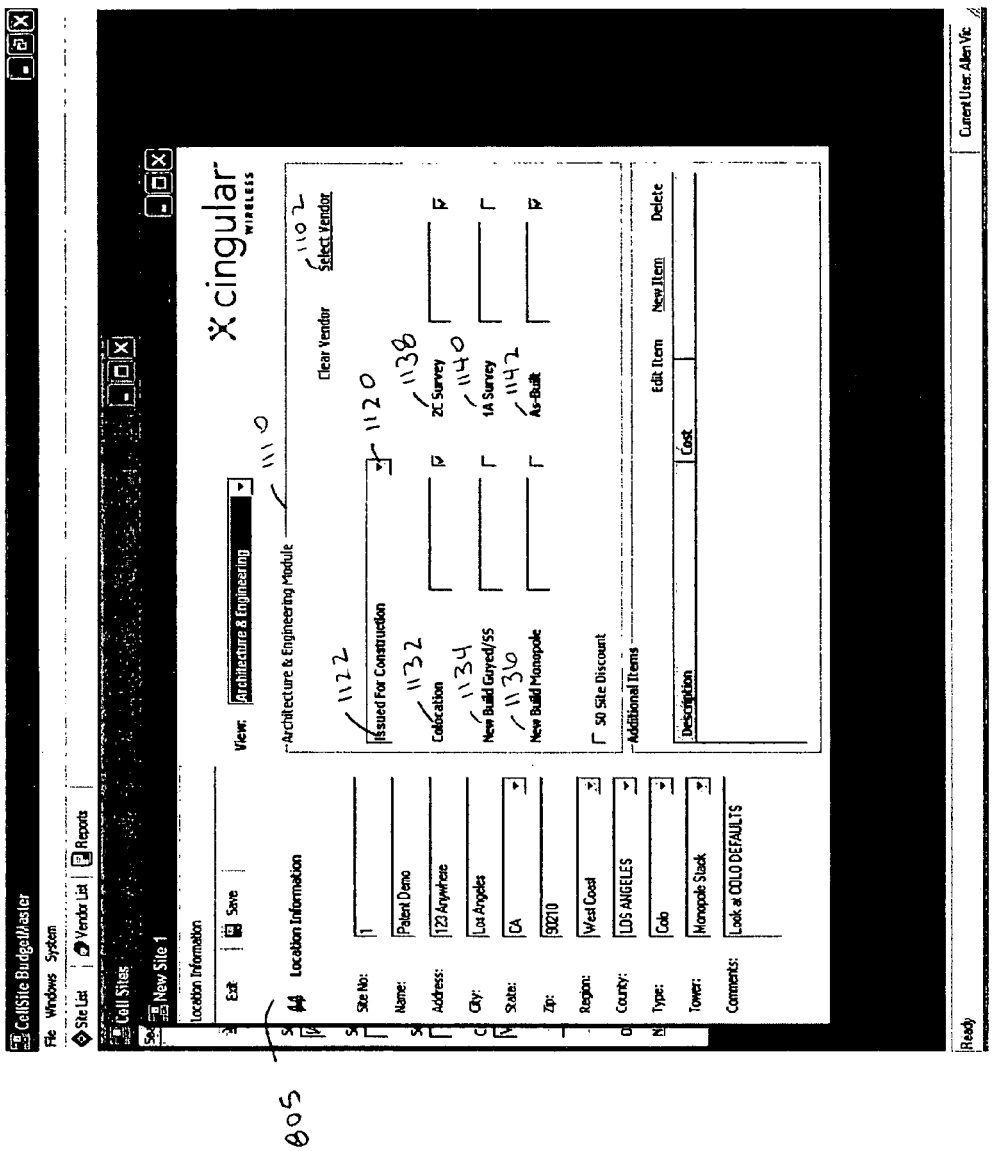

The reader is now referred back to the A&E services associated with A&E prompt 884 shown in FIG. 8. These services are for A&E activities including, but not limited to, site visits with Site Acquisition agents and with business team members to determine site layout/configuration. These services further include commission and complete Metes and bounds survey, along with 1A or 2C survey as specified, delivery of preliminary design drawings if required, issued drawings for permitting drawings (zoning, city review, etc), final issued drawings for construction drawings, structural analysis, as built drawings (if required), and Geotechnical explorations. If the user selects the A&E prompt 884, then an "Architecture & Engineering" view 1110 of FIG. 11 is displayed proximate to the Location Information view 805 that is populated with the initial cell site plan record. The Architecture & Engineering view 1110 displays a pull-down menu 1120 that allows the user to select services for Issued for Construction 1122 and for Issued for Permitting Only 1124 (not shown) that include six A&E services that may be performed for the proposed cell site design. These services are displayed as a "Colocation" prompt 1132, a "New Build Guyed/SS" prompt 1134, a "New Build Monopole" prompt 1136, a "2C Survey" prompt 1138, a "1A Survey" prompt 1140, and an "As-Built" prompt 1142. The scope of services for these prompts are set forth in Table 3 below. Further, CellSite BudgetMaster 110 uses business rules understood by those of ordinary skill in the art to automatically select the Colocation prompt 1132, 2C Survey prompt 1138, and the As-Built prompt 1142 since the initial cell record identified the Type 840 as a "Colo" and the default for Issued for Construction is selected. However, the user may de-select a defaulted prompt (here the defaults are 1132, 1138, and 1142) and control selection of a prompt that corresponds to the service needed for the A&E of the proposed cell site design. Further, the selection of Colocation 1132, New Build Guyed/SS 1134, or New Build Monopole 1136 is associated with a tower that is populated using a pull down menu for a Tower prompt 850. The pull down menu allows the user to specify if the tower is a Monopole Stack, Self-Support Stack, or a Guyed Tower Stack. Alternatively, the tower may be automatically selected by CellSite BudgetMaster 110 using intelligent rules for tower selection and the initial cell site plan record, the historical cell site plan record, and/or the vendor record.

TABLE 3

Standardized Scope of Work for Architecture & Engineering Services

| Service | Standardized Scope of Work for Service |
|---|---|
| Issued for Construction | Create preliminary site drawings for Company review and create Issued for Construction drawings of the final stamped drawings that the site will be constructed to, including: |
| Colocation | Produce preliminary design drawings for Company review. These drawings may become part of the lease exhibits. |

TABLE 3-continued

Standardized Scope of Work for Architecture & Engineering Services

| Service | Standardized Scope of Work for Service |
|---|---|
| New Build Guyed/SS<br>New Build Monopole | Provide drawings with a site layout, tower profile with antenna location (if site is not a tower, i.e., rooftop, then antenna location on structure). Elevation drawings shall include to scale heights to proposed antenna centerline, tip, structure height & overall structure height.<br>Coordinate with jurisdiction to verify regulations.<br>Provide Company with a minimum of 4 sets of stamped, by PE registered in state construction to be performed in. At a minimum, drawings have the following information:<br><br>Title Sheet<br>Project Name and Company Reference number<br>Site Address<br>Engineers/Architect contact information<br>Surveyor contact information<br>Property owner contact information<br>Company Construction contact information<br>Electric and Telco contact information<br>Local, County, or State jurisdiction contact information<br>Regional and Vicinity Map<br>Approval Signature Block<br>Revision Date Block<br>Property owner<br>Company Construction<br>Company RF<br>Stamped Survey Drawing. If required, can be several different pages<br>Parent Tract drawing<br>Parent Tract drawing should include any and all easements recorded for that property<br>Company Leased space drawing<br>Legal description of teased area<br>Legal description of access and utility easements<br>General Standard Provisions sheet (to be provided)<br>Civil Notes sheet<br>Site Plan Drawings<br>Detailed Site plans drawing<br>Tower/Structure Profile (specify antenna mounts, part numbers, and depict Company's rad center)<br>Antenna and Coaxial Cable Schedule (based upon Company's supplied RE configuration)<br>Antenna Plan Layout with individual antenna types/locations specified along with color codes, spacing, proper azimuths, etc.<br>Can include Ice Bridge detail on this page if applicable<br>Construction Detail drawing<br>Fence Specification, if applicable<br>Landscaping plan with details, if applicable<br>Site compound surfacing detail, if applicable<br>Access road detail, if applicable<br>Structural Notes<br>Structural Detail drawing<br>Shelter/Equipment Pad design<br>Platform design, if applicable<br>Foundation design, this to be supplied by tower manufacture<br>Electric and Telephone notes<br>Electric and Telephone wiring site plan<br>Utility detail drawing<br>Common Rack detail drawing<br>Meter<br>Common Telco demarc enclosure<br>Equipment grounding detail<br>Guy anchor detail, if applicable<br>Site Grounding detail, if applicable |
| Issued for Permitting | Create preliminary site drawings for Company review and develop design drawings for zoning and permitting, including: |
| Colocation | Produce preliminary design drawings for Company review. These drawings may become part of the lease exhibits. |
| New Build Guyed/SS<br>New Build Monopole | Provide drawings with a site layout, tower profile with antenna location (if site is not a tower, i.e., rooftop, then antenna location on structure). Elevation drawings shall include to scale heights to proposed antenna centerline, tip, structure height & overall structure height.<br>Coordinate with jurisdiction to verify regulations.<br>Develop drawings detailed enough to present to local jurisdictions for zoning, and/or permitting. |

TABLE 3-continued

Standardized Scope of Work for Architecture & Engineering Services

| Service | Standardized Scope of Work for Service |
|---|---|
| 2C Survey | Work with local jurisdiction or Zoning contractor to meet City, State, and Federal regulations.<br>If preliminary design available, notify Company of any deviations to due to zoning, permitting requirements.<br>Land survey activities to include, but not limited to a Metes and bounds survey, with drawing to show all recorded easements, existing and proposed utility routing. Also with the survey will be a 2C tolerance letter (as specified) verifying land elevations.<br>These services typically include: |
| | Provide Metes and bounds survey detail drawing to Company. Drawing shall show all utility easements including overhead & underground utility runs, locations of and distances of to nearest electrical and telephone service, with all utility pole and transformer numbers to be labeled on survey map.<br>Perform 2C tolerance (as specified) elevation survey.<br>Provide Leased area legal description and access and utility legal description. These descriptions can be located on the drawing.<br>Stake Company's leased space boundaries, and proposed tower location with on-site field verification from Company construction. |
| 1A Survey | Land survey activities to include, but not limited to a Metes and bounds survey, with drawing to show all recorded easements, existing and proposed utility routing. Also with the survey will be a 1A tolerance letter (as specified) verifying land elevations.<br>These services typically include: |
| | Provide Metes and bounds survey detail drawing to Company. Drawing shall show all utility easements including overhead & underground utility runs, locations of and distances to nearest electrical and telephone service, with all utility pole and transformer numbers to be labeled on survey map.<br>Perform 1A tolerance (as specified) elevation survey.<br>Provide Leased area legal description and access and utility legal description. These descriptions can be located on the drawing.<br>Stake Company's leased space boundaries, and proposed tower location with on-site field verification from Company construction. |
| As-Built Drawings | As Built Drawings are to be representations of changes that occurred to the site during construction. These service typically include: |
| | Work with Construction contractors and Company to produce As Built drawings.<br>Company will require a minimum of 3 copies of these drawings. As Builts must be in accordance with applicable tower management company requirements. |

Figure 12:
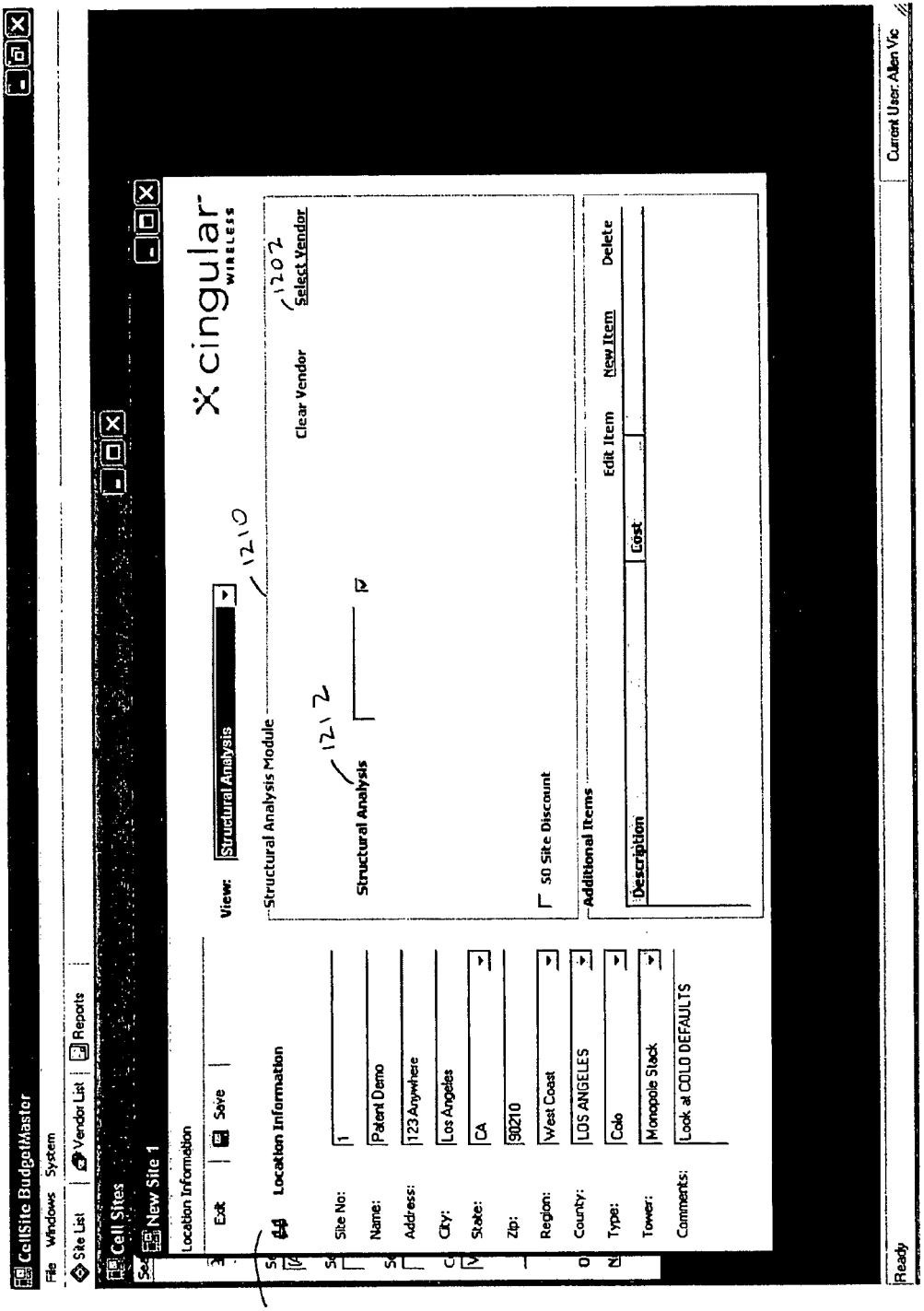

The reader is again referred back to the Structural service associated with Structural prompt 890 shown in FIG. 8. This service is for Structural Analysis activities of the contractor to provide a stamped opinion on structural adequacy of an existing Tower structure for a colocation. This is to include, but not limited to colocations (i.e., a "Colo" Type) for Monopoles, Guyed Towers, or Self Support towers. If the user selects the Structural prompt 890, then a "Structural Analysis" view 1210 of FIG. 12 is displayed proximate to the Location Information view 805 that is populated with the initial cell site plan record. The Structural Analysis view 1210 displays a single service that may be performed for the proposed cell site design. This service is displayed as a "Structural Analysis" prompt 1212. The scope of this service is set forth in Table 4 below. Further, CellSite BudgetMaster 110 uses business rules understood by those of ordinary skill in the art to automatically select the Structural Analysis prompt 1212 since the initial cell record identified the Type 840 as a "Colo." However, the user may de-select the defaulted prompt (here the default is 1212) and control selection of the prompt to correspond whether the Structural Analysis is needed for the proposed cell site design.

TABLE 4

Standardized Scope of Work for Structural Analysis Service

| Service | Standardized Scope of Work for Service |
|---|---|
| Structural Analysis | Perform analysis using latest EIA/TIA specifications<br>Suggest reinforcing ideas, including cable distribution, guywire tension adjustments, back-to-back member placement, etc<br>Provide detailed report to Company, stamped by PE registered in state tower is located in. |

TABLE 4-continued

Standardized Scope of Work for Structural Analysis Service

| Service | Standardized Scope of Work for Service |
|---|---|
|  | If tower design unavailable, map tower for all information to perform the analysis. |

Figure 13:
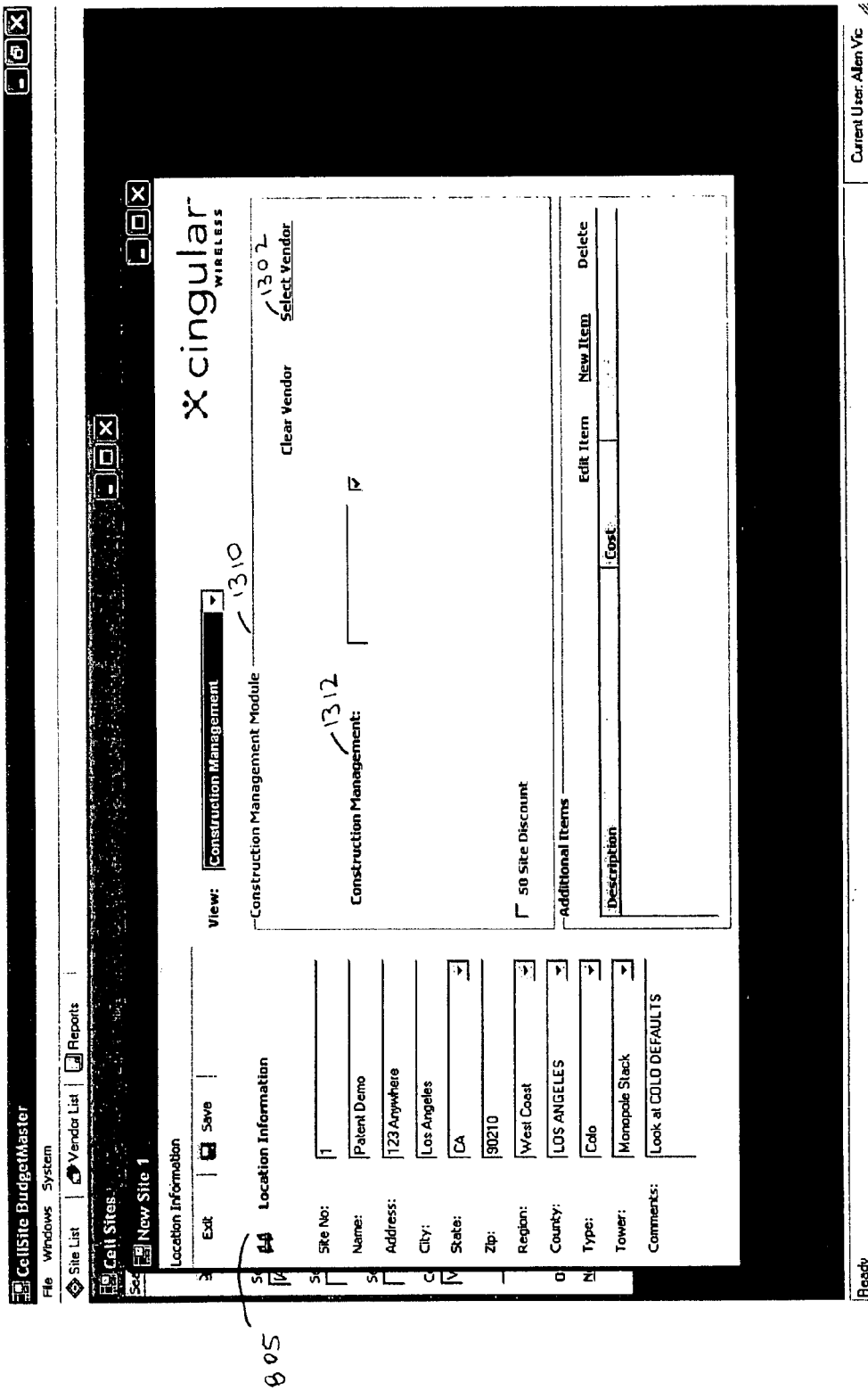

The reader is again referred back to FIG. 8 and the "Construction Management" prompt 888. This service is for Construction Management activities that include, but are not limited to, submitting and tracking building permit(s) from the local jurisdiction(s), preparing bid packages for general contractors, performing bid walks, coordinating with the land owner(s), coordinating with power and telephone companies, performing site construction punch walks per Company's specification, providing a weekly update via email to Company's Construction Manager and obtaining all completion packages needed from civil and antenna/line contractors. If the user selects the Construction Mgmt. prompt 888, then a "Construction Management" view 1310 of FIG. 13 is displayed proximate to the Location Information view 805 that is populated with the initial cell site plan record. The Construction Management view 1310 displays a single service that may be performed for the proposed cell site design. This service is displayed as a "Construction Management" prompt 1312. The scope of this service is set forth in Table 5 below. Further, CellSite BudgetMaster 110 uses business rules understood by those of ordinary skill in the art to automatically select the Construction Management prompt 1312. However, the user may de-select the defaulted prompt (here the default is 1312) and control selection of the prompt to correspond whether the Construction Management is needed for the proposed cell site design.

TABLE 5

Standardized Scope of Work for Construction Management Service

| Service | Standardized Scope of Work for Service |
|---|---|
| Construction Management | Coordinate all Architectural and Engineering documents with A&E contractors. Invoicing will be a paid directly by Company. Perform bid walks with Company approved vendors at each site to ensure best pricing and minimum change orders. (Company's Construction Manager must approve all change orders) Contractor will submit to Company copies of all quotes. Contractor will recommend construction contractors based on price, performance, overall value. Submit and track all applicable building and electrical permits at the same time bid packages go out. Construction services contractors will pull and pay for these permits. After reviewing Company's response to construction quotes, Contractor will notify winning bidder that they have been selected. Contractor will notify construction contractors that did not win the job, that they were not picked. Contractor will create construction schedule with input from winning construction contractor. Coordinate with Company to ensure that construction does not begin without proper regulatory approvals. Coordinate with Company equipment deliveries and sets at site construction location. Coordinate tower anchor bolt delivery if applicable. Coordinate tower delivery. Coordinate pickup of Company supplied material at a warehouse located in the market work is being performed in. Provide Company's Construction Manager with weekly pictures and updates via email weekly. Coordinate with concrete testing labs and verify tests are performed and concrete integrity is in tolerance per engineering specifications before equipment and tower is installed on site. Perform a telco site walk with local phone company and drive local phone company to deliver services as quickly as possible. Ensure that all work is completed per the construction drawings and per Company's specifications. Drive all construction activities to meet agreed upon construction schedule. Quality assurance for all site construction to include completing punch lists and correcting deficiencies noted. Post FCC # at site. Make sure the civil and antenna contractors provide a standard site completion package to Company CM. Include concrete break test reports in package. Coordinate and Track milestones associated with<br><br>Inspections<br>Construction<br>Documentation<br>Bid Awards<br>Architectural and Engineering<br>Environmental/Geotechnical<br>Zoning |

Figure 14:
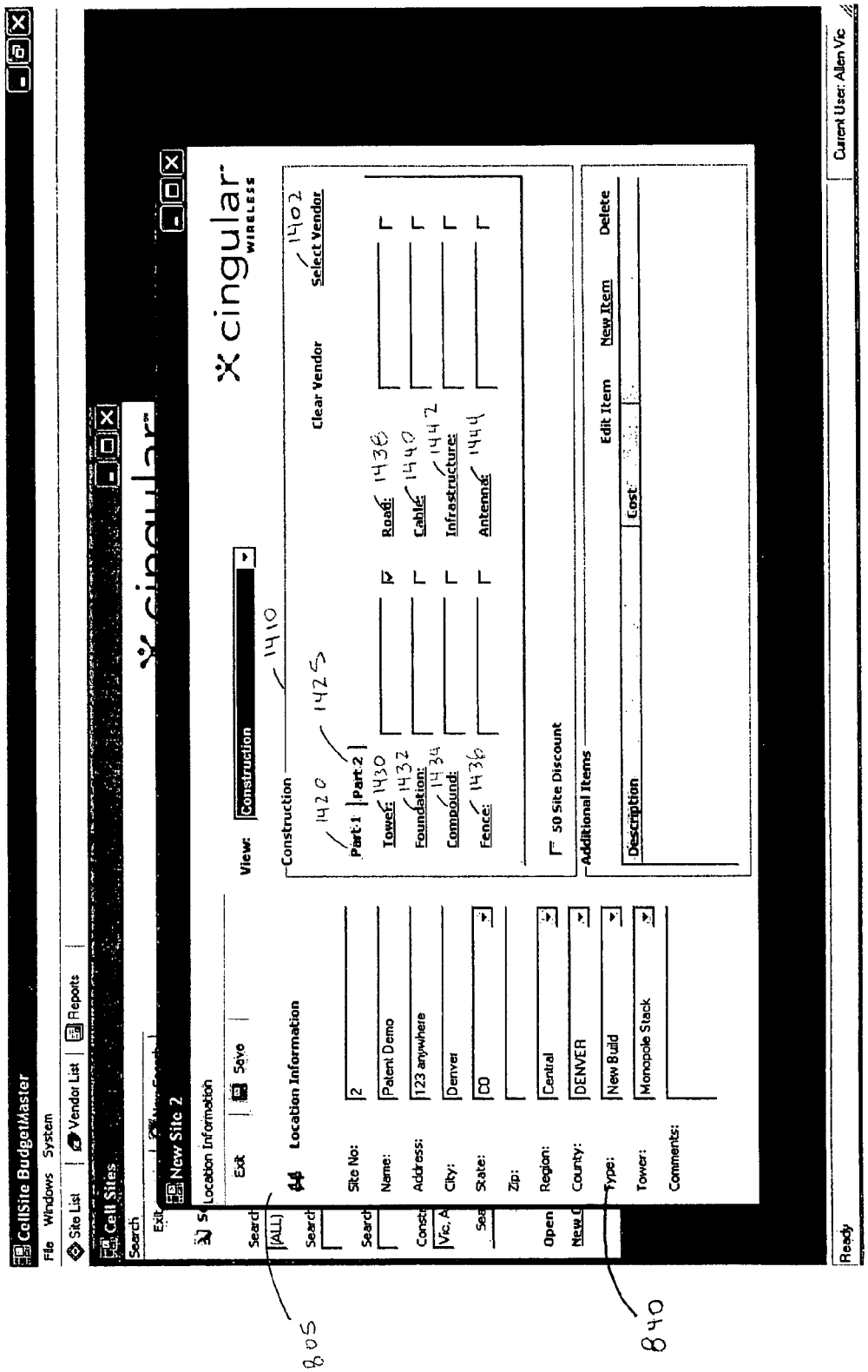
Figure 15:
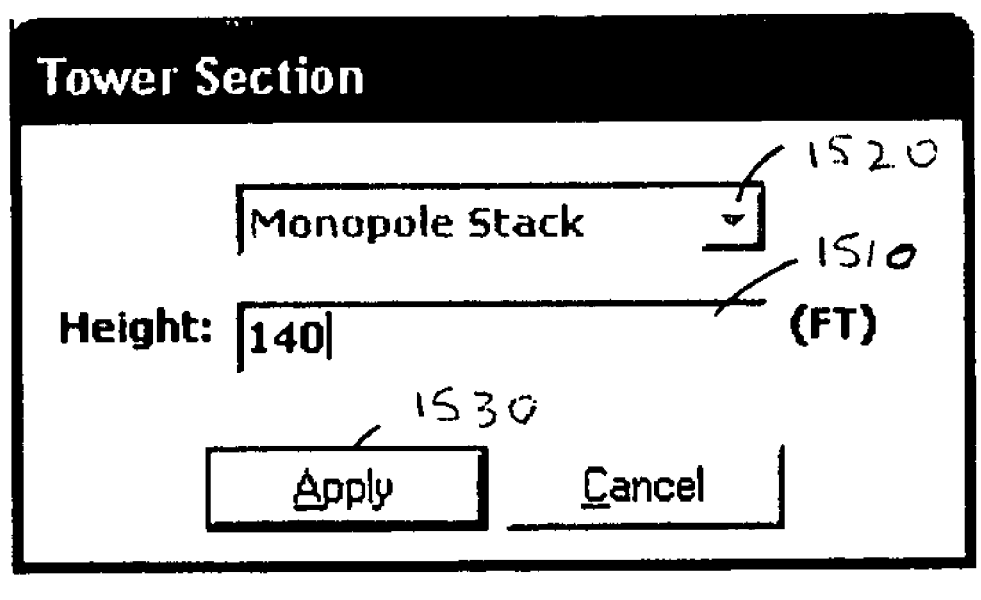
Figure 16:
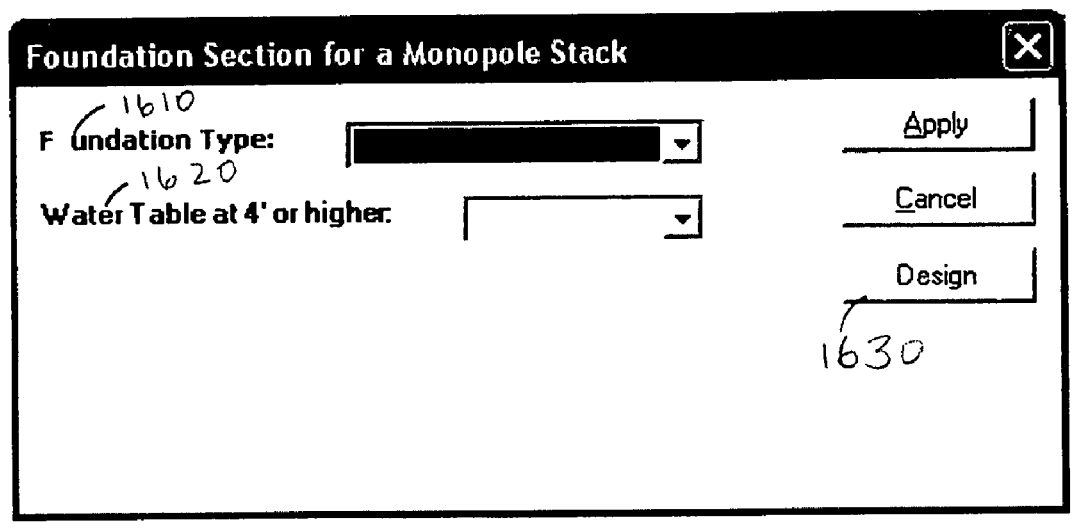
Figure 19:
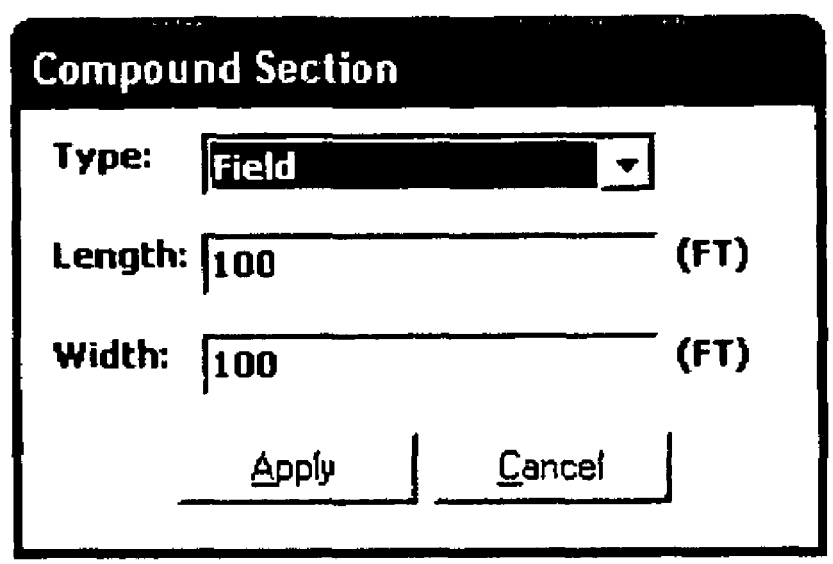
Figure 20:
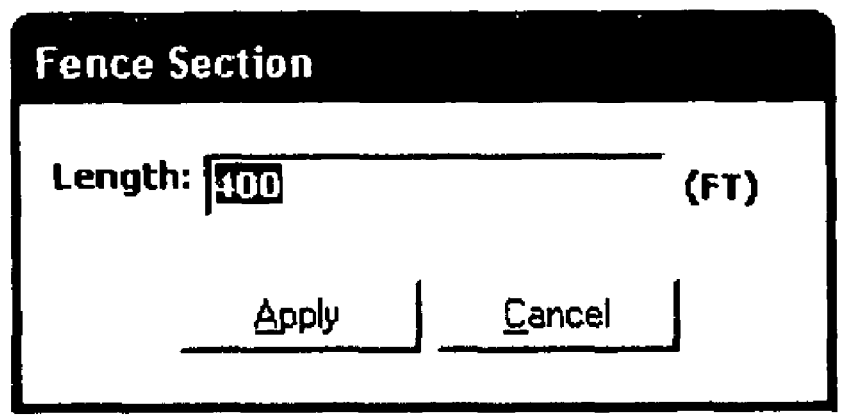
Figure 21:
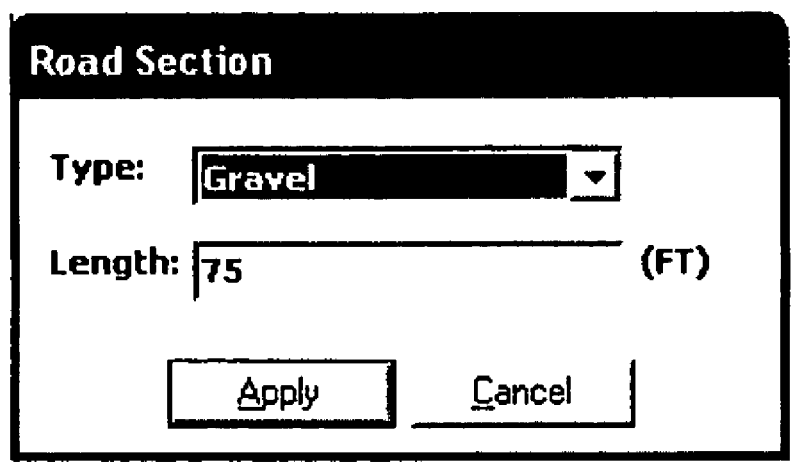
Figure 23:
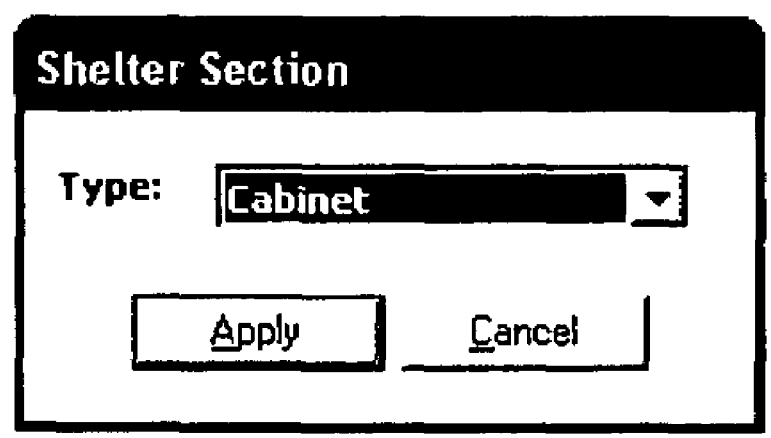
Figure 24:
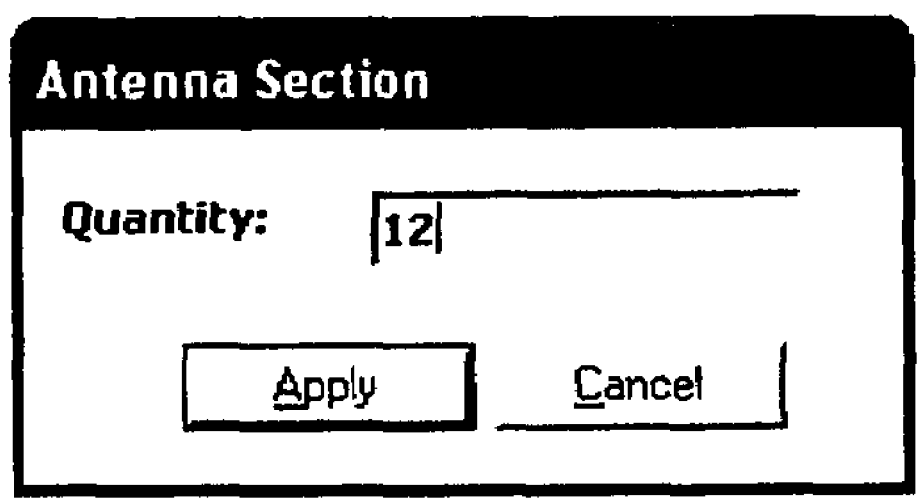

The reader is again referred back to FIG. 8 and the Construction services associated with the "Construction" prompt 890. These services are for Construction activities including all civil construction of the cell site tower, antenna, and line installation for the proposed cell site design. If the user selects the Construction prompt 890, then a "Construction" view 1410 of FIG. 14 is displayed proximate to the Location Information view 805 that is populated with the initial cell site plan record. Notice that for these embodiments, the Type 840 is for a "New Build" (i.e., the proposed cell site design is for a new tower) whereas the embodiments of the above five modules are for a "Colo" (i.e., the proposed cell site design is integrated with an existing tower). The Construction view 1410 displays two parts—Part 1 tab 1420 and Part 2 tab 1425. The Part 1 tab 1420 view identifies eight services that may be performed for the proposed cell site design—a "Tower" prompt 1430, a "Foundation" prompt 1432, a "Compound" prompt 1434, a "Fence" prompt 1436, a "Road" prompt 1438, a "Cable" prompt 1440, an "Infrastructure" prompt 1442, and an "Antenna" prompt 1444. The underline for each of the prompts (shown in FIG. 14 as prompts 1430-1444) indicates that the user must click on a selected underlined prompt to specify additional information if the service of that prompt is needed for the proposed cell site design. For example, the Tower prompt 1430 is selected, so the user would click on the underlined word "Tower" to navigate to a Tower Section screen 1500 of FIG. 15. The Tower Section screen 1500 prompts the user to input a height of the tower in a "Height" prompt 1510. The height value may be obtained from a Mobile Telecommunications Service Provider (e.g., Cingular Wireless LLC) who is usually the responsible "Company" for planning and managing costs of the proposed cell site. In addition, the user may also elect to use pull down menu 1520 to specify the Tower; however, this selection does not have to be made by the user, rather CellSite BudgetMaster 110 may use the initial cell site plan record, the historical cell site plan record, and/or the vendor record to automatically select a Tower as mentioned above. After the height is input, the user may press the "Apply" button 1530 to navigate to a Foundation Section for a Monopole Stack screen 1600 of FIG. 16 to use a pull down menu of "Foundation Type" prompt 1610 to choose a foundation and to use a pull down menu of "Water Table at 4' or higher" prompt 1620 to choose whether the water table is at four feet or higher at the proposed cell site location. Thereafter, the user may press the "Design" button 1630 to navigate to a Foundation Design Form screen 1700 of FIG. 17. The Foundation Design Form screen 1700 displays the inputs or defaulted values for a "Water Table at 4' or higher" prompt 1710, a "Foundation Type" prompt and/or output 1720, a "Tower Height" prompt 1730, and a "Total Volume" output 1740. Further, the Foundation Design Form screen 1700 displays a "Foundation Design" view 1750 that specifies (1) a wind speed used for the proposed cell site design, (2) a height, (3) a tower selection, (4) whether the site location has a water table below 4', (5) a foundation type, (6) dimensions of the foundation type (shown as diameter and length which are relevant measurements for determining volume), and (7) a volume of concrete for the foundation. For example, according to an embodiment of this invention, the wind speed for the proposed cell site design is automatically selected by matching the geographic location of the initial cell site plan record to a design wind speed based on the highest three second gust in fifty years stored in the historic cell site plan record. Further, the historic cell site plan record contains parametric values of tower reactions and applicable foundation sizes. For example, FIGS. 18A-B illustrate parametric values for tower reactions at ninety miles per hour (90 mph) and corresponding foundation sizes and types for each tower, with and without water. In addition, the user may select the "Compound" prompt 1434, the "Fence" prompt 1436, the "Road" prompt 1438, the "Cable" prompt 1440, the "Infrastructure" prompt 1442, and the "Antenna" prompt 1444 to navigate to corresponding detailed views 1900-2400 of FIGS. 19-24.

Figure 25:
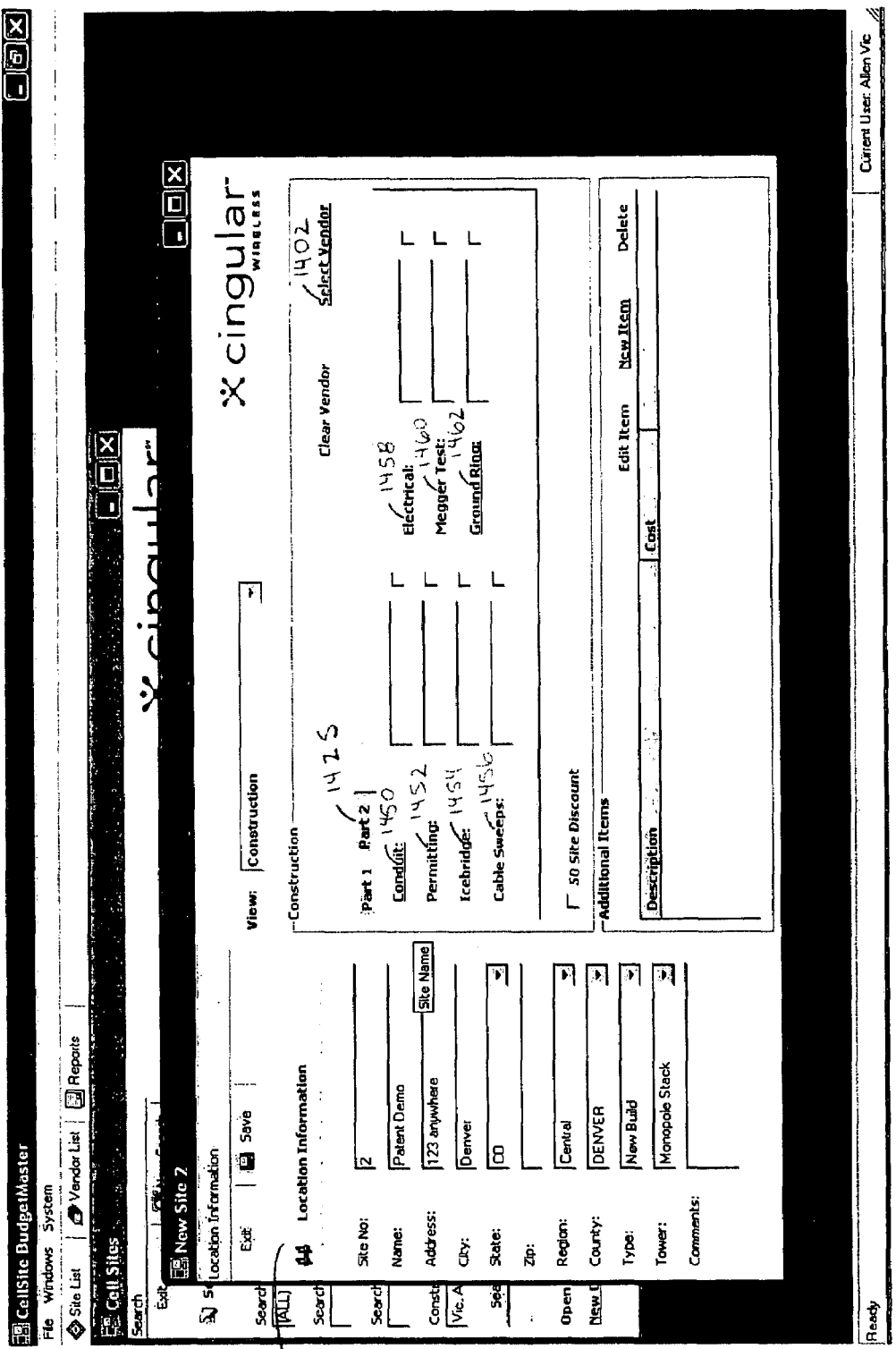

The Part 2 tab 1425 view of FIG. 25 identifies seven additional construction services that may be performed for the proposed cell site design—a "Conduit" prompt 1450, a "Permitting" prompt 1452, an "Icebridge" prompt 1454, a "Cable Sweeps" prompt 1456, an "Electrical" prompt 1458, a "Megger Test" prompt 1460, and a "Ground Ring" prompt 1462. Similar to above, the underline for each of the prompts (shown in FIG. 25 as prompts 1450 and 1462) indicates that the user must click on a selected underlined prompt to specify additional information if the service of that prompt is needed for the proposed cell site design. For example, the user could click on the underlined word "Conduit" to navigate to a Conduit Section screen 2600 of FIG. 26. As shown in the figures, underlined prompts associated with services of the module require user input; however, if the user does not provide inputs, then BudgetMaster 110 uses defaults to determine the proposed cell site design. The scope of all fifteen (15) Constructions services are set forth in Table 6 below. Further, CellSite BudgetMaster 110 uses business practices understood by those of ordinary skill in the art to automatically populate default values for some of the Construction service prompts. However, the user may de-select the defaulted value and specify an alternate value if desired.

TABLE 6

Standardized Scope of Work for Construction Services

| Service | Standardized Scope of Work for Service |
| --- | --- |
| Tower | Monopole Stack |
| | Assume Slip joint Monopole. |
| | Assume platform unassembled. |
| | Provide crane to offload and erect tower. |
| | Provide tower height verification (form to be provided by Company) |
| | Self Support Stack |
| | Assume platform unassembled. |
| | Provide crane to offload and erect tower. |
| | Installation of Coax support ladder up tower. |

TABLE 6-continued

Standardized Scope of Work for Construction Services

| Service | Standardized Scope of Work for Service |
|---|---|
| | Provide tower height verification (form to be provided by Company) |
| | Guyed Tower Stack |
| | |
| | Assume platform unassembled. |
| | Assume installation of Tower lighting system |
| | Provide crane to offload and erect tower |
| | Provide tower height verification (form to be provided by Company) |
| Foundation | Cassion Drilling. 4' diameter. 6' diameter. 8' diameter, and 10' diameter |
| | |
| | Water Table at 4' or Higher. |
| | |
| | Contractor is to assume no rock. |
| | Provide ALL excavation and drilling equipment to complete the job per engineered foundation drawings. |
| | Water Table at below foundation. |
| | |
| | Contractor is to assume no rock. |
| | Provide ALL excavation and drilling equipment to complete the job per engineered foundation drawings. |
| | Pad and Pier Pour |
| | |
| | Water Table at below foundation |
| | |
| | Contractor is to assume no rock. |
| | Assume 4200 PSI concrete |
| | Provide concrete for pour |
| | Provide all excavation of soils. |
| | Provide soil removal and disposal if required |
| | Provide ALL foundation reinforcement bars as required |
| | Placement and position of tower anchor bolts, and guy anchors when required. |
| | Company WILL NOT provide surveyor to assist contractor. |
| | Water Table above foundation |
| | |
| | Contractor is to assume no rock: |
| | Assume 4200 PSI concrete |
| | Provide concrete for pour |
| | Provide all excavation of soils. |
| | Provide soil removal and disposal if required. |
| | Provide ALL foundation reinforcement bars as required. |
| | Placement and position of tower anchor bolts, and guy anchors when required. |
| | Company WILL NOT provide surveyor to assist contractor. |
| Compound | Heavily wooded |
| | |
| | Removal of all trees, stumps, undergrowth, grass, and weeds from Company leased area. |
| | Remove and properly dispose of rubbish offsite. NO BURNING. |
| | Bring lease area to grade per construction drawings. |
| | Subgrade compaction to 95% in all Fenced and roadway areas |
| | Add Mirafi 500x or equivalent geotextile fabric |
| | Add 4" of #57 stone to fenced area |
| | Field |
| | |
| | Removal of all grass and weeds from Company leased area. |
| | Remove rubbish and properly dispose of offsite. NO BURNING. |
| | Bring lease area to grade per construction drawings. |
| | Subgrade compaction to 95% in all Fenced areas. |
| | Add Mirafi S00x or equivalent geotextile fabric. |
| | Add 4" of #57 stone to fenced area. |
| Fence | Assume no rock. |
| | Provide and Install the following: |
| | |
| | 9 gauge 2" × 2" 6' fabric chain link fence |
| | 4" Standard gauge Gate post |
| | 2" standard gauge fence post (10" center to center installation |
| | 3" standard gauge Corner post |
| | 12 gauge galvanized barb wire (3 strands around top of fence) |
| | 1 ½" standard gauge top rail post |
| | 45 degree arms for 3 strands barb wire |
| | Chain and Lock for gate |

TABLE 6-continued

Standardized Scope of Work for Construction Services

| Service | Standardized Scope of Work for Service |
|---|---|
| Road | Mushroom gate stop<br>2 each 6' gate panels<br>Gravel<br><br>Prepare subgrade to 95% compaction<br>Add Mirafi 500x or equivalent geotextile fabric<br>4" of Flex stone surface<br>Paved<br><br>Prepare subgrade to 95% compaction<br>4" of Flex stone surface compacted to 95%<br>Apply 3" of pavement |
| Cable | Pick up all Company supplied material from warehouse<br>located in Company area where work to be performed.<br>Support feedline per manufactures recommendations.<br>Install connectors per manufactures recommendations.<br>Supply and install feedline designation markings.<br>Ground feedline in 4 places. Contractor will supply and install<br>all grounding bars and related hardware.<br><br>At top of tower at the down transition (single<br>downlead bonded from 2" × 13" ground bars for each sector)<br>At the bottom of the tower at the transition to the icebridge<br>Outside the shelter entry port plate<br>Inside the shelter at the entry port plate<br>Feedlines will terminate 12" to 18" inside shelter at the port<br>plate. Contractor must coordinate line termination with<br>Company technical operations or construction personnel, if required.<br>Provide and install feedline port plate at shelter.<br><br>MTS EP1447 with Boots. Provide and install all feed<br>through boot assemblies. |
| Infrastructure | Cabinet Set<br><br>Provide lifting to offload and Set Equipment<br>Provide and install 6' wide power and telco rack. Rack will<br>be constructed from 3 each 10' long 3" Schedule 40<br>galvanized pipes with end caps, pipes to be inserted into<br>ground minimum 3', leaving 7' above grade, Pipes to be<br>installed on 4' centers.<br>Cross members to be 1 ½' galvanized unistrut, 3 each on front side of rack and 5<br>each on back side.<br>Equipment Shelter Set<br><br>Assume shelter weight of 50,000 lbs.<br>Assume 12' × 24' shelter.<br>Provide lifting to offload and Set Shelter.<br>Provide and install 6' wide power and telco rack (meter<br>pedestal shall be constructed of Unistrut and pipes). |
| Antenna | Assume Tower 10' from shelter.<br>Pick up all Company supplied material from warehouse<br>located in Company area where work to be performed.<br>Install antenna to conform azimuth, height, and tilt according<br>to Company specifications.<br>Provide antenna height verification to include antenna<br>centerline and antenna tip height verification once antennas<br>are hung (form to be provided by Company). |
| Conduit | Trench ground for underground conduit runs.<br>Provide and install PVC schedule 40 conduits from Telco<br>pedestal and separate conduit from electric transformer to<br>Common Meter and Demarc Rack.<br>Provide and install PVC schedule 40 conduits from Common<br>meter and demarc rack to shelter or Cabinet. |
| Permitting | Contractor will pull all applicable permits submitted by others.<br>All cost associated with permitting will be a pass through to<br>Company. |
| Icebridge | Supply and install gripstrut Icebridge and feedline trapeze under icebridge. |
| Cable Sweeps | Assume Tower 12 runs of Feedline.<br>Provide all test equipment to perform the test.<br>Each feedline run will be tested the following way:<br>Test feedline in an OPEN condition<br>Nothing terminated to the feedline at the antenna<br>Test feedline through a 50 ohm termination<br>Test feedline though the antenna.<br>Print 3 copies of the sweeps. |

TABLE 6-continued

Standardized Scope of Work for Construction Services

| Service | Standardized Scope of Work for Service |
|---|---|
| | Leave 1 copy in the cell site equipment cabinet or Shelter |
| | Provide Company Construction Management with 1 copy in closeout package. |
| | Keep 1 copy for contractor's files for a minimum of 5 years. |
| Electrical | Cabinet Set |
| | Included in the electrical work: |
| | Provide and install 200 amp service meter base |
| | Provide and install 200 amp disconnect switch |
| | Provide and install 200 amp manual transfer switch |
| | Provide and install telco demarc box (Nema 3R rated 36" h × 36" w × 12" d). Provide and install 5/8 plywood backing inside box. |
| | Complete connections of electrical circuits to cabinet. |
| | Equipment Shelter Set |
| | Included in the electrical work: |
| | Provide and install 200 amp service meter base |
| | Provide and install 200 amp disconnect switch |
| | Provide and install telco demarc box (Nema 3R rated 36" h × 36" w × 12" d). |
| | Provide and install 5/8 plywood backing inside box. |
| | Complete connection of electrical circuits to the Shelter. |
| Megger Test | Have licensed electrician take preconstruction earth megger soil resistivity test readings using fall of potential methodology in three directions if possible, and report results to Company construction. If initial test exceeds 5 Mega ohms, contractor shall encase buried ground ring in Gem Earth or equivalent materials to achieve as-built results of < or = 5 Megohms. For extremely high base readings, a contingency plan to install XIT rods, chemical system or ground grid plan shall be developed. |
| Ground Ring | Provide and install grounding system to Company's specifications. See exhibit 1 for typical cell site grounding detail. |
| | All ground leads shall be No. 2 AWG solid tinned copper will be used for external grounding system. |
| | All ground connections will be exothermically welded, except Guy wires |
| | All exothermic welds to galvanized finishes will be sprayed with galvanizing paint. |
| | Contact Company's Construction Management for inspections before grounding trenches are covered. |

Figure 27:
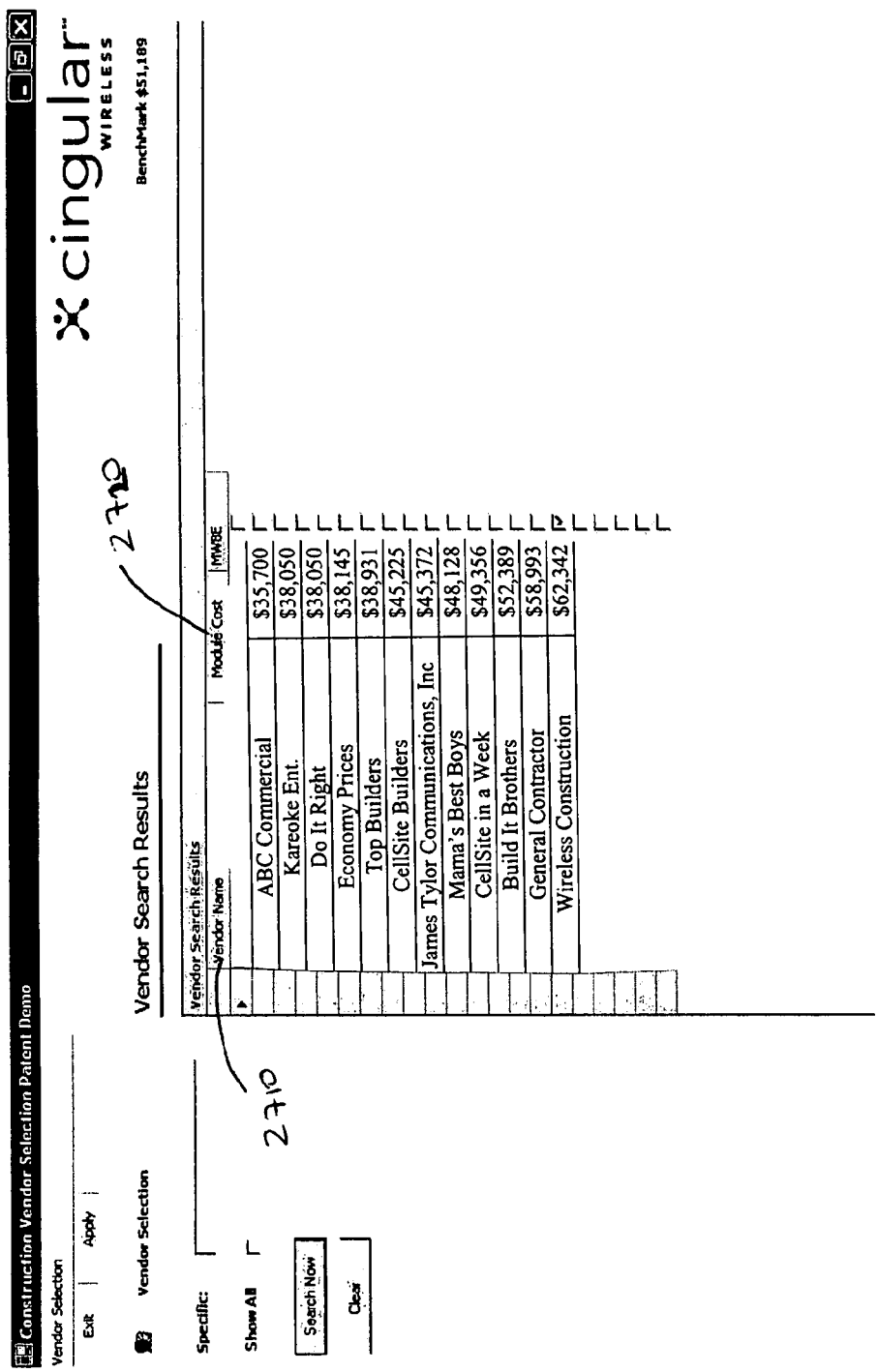
Figure 28:
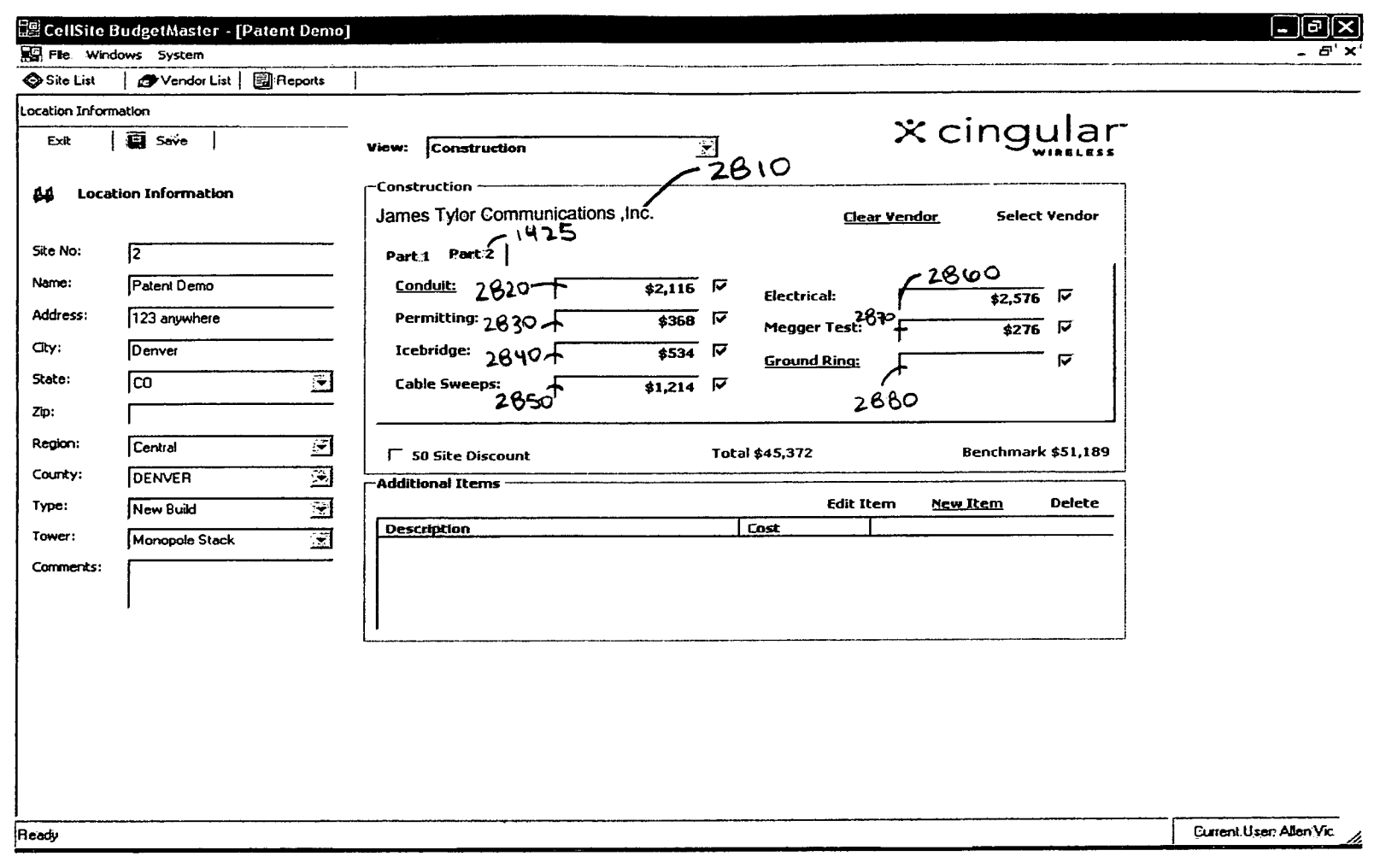

After the user has input values and/or used default values as discussed above for each of the modules to generate the proposed cell site design, the user may click on the underlined word "SelectVendor" (shown as reference numerals 902, 1002, 1102, 1202, 1302, 1402, and 2502 of FIGS. 9-14 and 25). Thereafter, CellSite BudgetMaster 110 generates vendor search results identifying one or more vendor records by a vendor name, module cost, and benchmark module cost (shown as reference numeral 2730 of FIG. 27) that are compiled from the vendor record and the historic cell site plan record and/or initial cell site plan record. For example, FIG. 27 illustrates the Vendor Search Results screen 2700 generated from the inputs and/or default values of FIGS. 14 and 25. The Vendor Search Results screen 2700 displays a list of vendor names 2710 and module cost 2720 associated with each vendor name. The vendor names 2710 are listed from a lowest financial value to a highest financial value for the module cost. In addition, a benchmark financial value of the service(s) for that module 2730 is displayed in the upper right hand corner for comparison with each named vendor's module cost 2720. According to embodiments of this invention, the benchmark financial value 2730 is calculated by (1) selecting vendor records that match (a) the geographic region of the cell site identifier and/or (b) have a financial value for the service(s) needed of the proposed cell site design (e.g., if the proposed cell site design needed a Structural Analysis service, then only vendors having a structural analysis billing record (i.e., a financial value) for the Structural Analysis service are matched. Note that the benchmark financial value changes if any of the following changes geographic area, services of the module/module, and the proposed cell site design. Thereafter, the vendor records are ranked from a lowest to a highest financial value for each module and an average financial value is calculated to derive the benchmark financial value. In various embodiments, a percentage of the lowest financial values may be discarded to eliminate "lowball" vendors, and then an average of the remaining financial values is calculated to determine the benchmark financial value. Similarly, a percentage of the highest financial values may be discarded to eliminate excessively-priced vendors, and then an average of the remaining financial values is calculated to determine the benchmark financial value. Furthermore, CellSite BudgetMaster 110 allows the user to update the vendor record. For example, the user could contact a named vendor with a higher billing record to advise him of the benchmark financial value and negotiate a lower billing record that is equal to or less than the benchmark financial value. Still further, if the user is satisfied with the named vendor's total billing record(s) for the service(s) of a selected module for the proposed cell site design, then the user can select the named vendor, such as, for example by double clicking on the named vendor 2710 from the list shown in FIG. 27. BudgetMaster 110 then displays the selected vendor and associated billing record(s) for each service of the module for the proposed cell site design. FIG. 28 illustrates a selected vendor 2810 shown here as a vendor named "James Tylor Communications, Inc." along with the selected vendor's billing record(s) of each service of the module for the proposed cell site design. Here the billing records are for construction services and include a Conduit billing record 2820 (shown as $2,116), a Permitting billing record 2830 (shown as $368), an Icebridge billing record 2840 (shown as $2840), a Cable Sweeps billing record 2850 (shown as $1,214), an Electrical billing record 2860 (shown as $2,576), and a Megger Test billing record 2870 (shown as $276).

Figure 29:
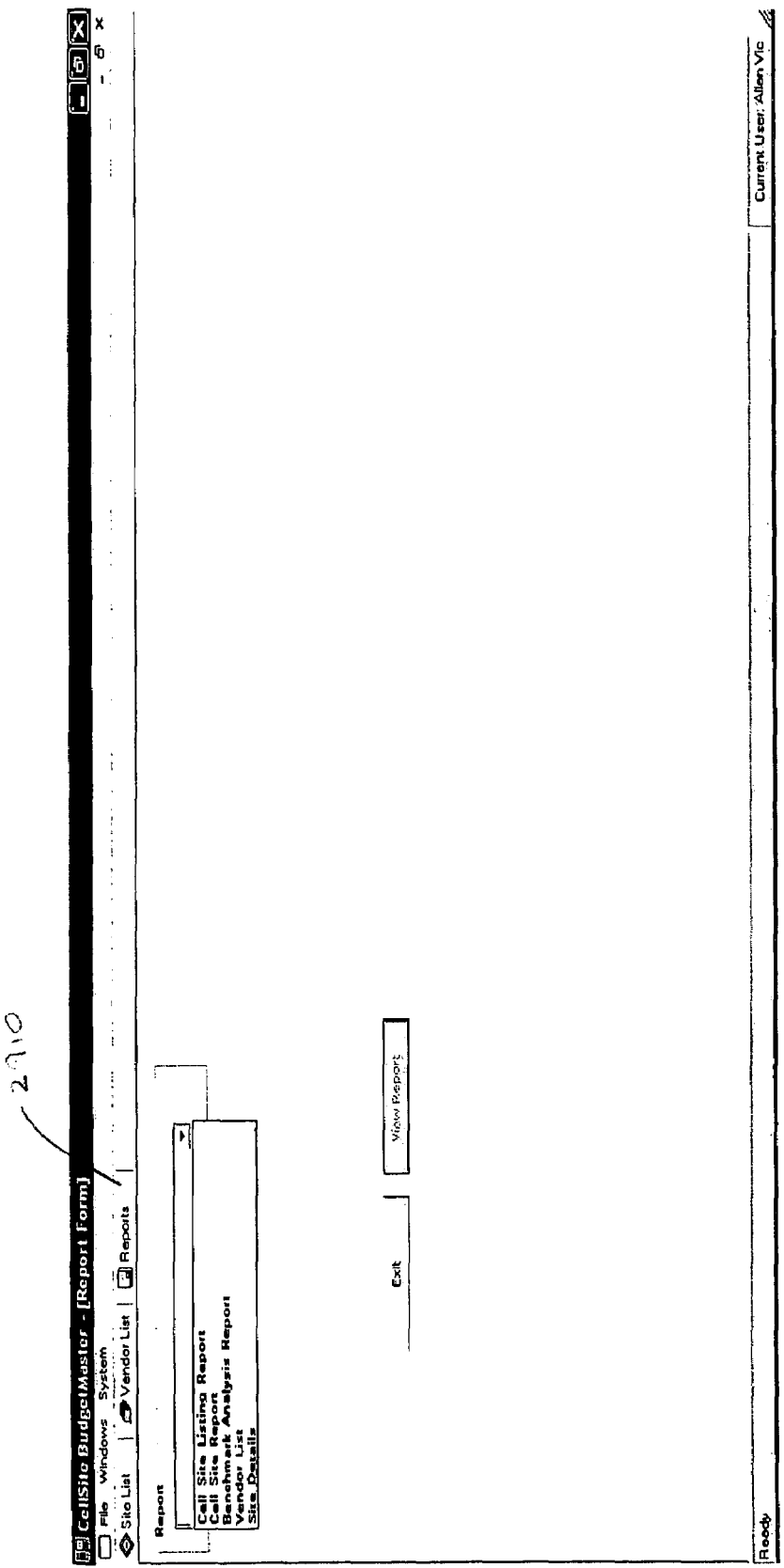

The initial cell site plan record and the compiled cell site design and billing record is stored and maintained by CellSite BudgetMaster 110 so that the user and/or others can store, access, modify, and/or otherwise manage the data. As discussed earlier with reference to FIG. 5, CellSite BudgetMaster 110 also performs ad-hoc queries of one or more vendor records and generates reports for the proposed cell site design, the initial cell site plan record, the historic cell site plan record, the vendor record, and/or the compiled cell site design and billing record. For example, FIG. 29 illustrates a Reports view 2900 that allows the user to use a pull down Report menu prompt 2910 to generate, display, and/or print a report. In various embodiments, the user could select any of these reports to display and further analyze data of the report. The user could select a Cell Site Listing Report 3000A-C shown in FIGS. 30A-C to display all cell sites identified by region, by Construction Manager, by Total Cost to build the proposed cell site of the listing, by Benchmark financial value of the proposed cell site design, and so on. The user could select a Cell Site Report 3100 shown in FIG. 31 to display an overview of all module(s), selected vendor(s), and benchmark financial value(s) of each module of the proposed cell site design. Further, the user could select a Benchmark Analysis Report 3200 shown in FIG. 32 to display all vendors who had billing records less than or equal to the benchmark financial value for a service of the proposed cell site design. Still further, the user could select a Vendor List Report 3300 shown in FIG. 33 to access and display all vendors who submitted billing record(s) for a geographic location. And, finally, the user could select a Site Details Report 3400 shown in FIG. 34 to access and display site specific information for each service of the proposed cell site design. The Site Details Report 3400 is typically used for cost records and explanations.

FIGS. 35-36 illustrate tables, fields, and/or other identifiers of the vendor record stored by CellSite BudgetMaster 110. Typically, the cell site designer or other personnel provide this form to a vendor to fill out and "bid" on future work. The alphanumeric fields specified by the vendor are then used to populate the vendor record of CellSite BudgetMaster 110 so that the vendor can be matched with work in a common geographic area and considered for proposed and future cell site construction and/or planning. One of the goals is to have all vendors who provide a service for the proposed cell site design have a vendor record to eliminate having an open bid process and to provide billing records for comparison with other area vendors. And, this is one of the main principles of the benchmark financial value 2730. In addition, CellSite BudgetMaster 110 includes a comments field that allows the user to critique performance of each vendor and store that information with the vendor record so that future users have an appreciation of the vendor's performance.

Figure 37:
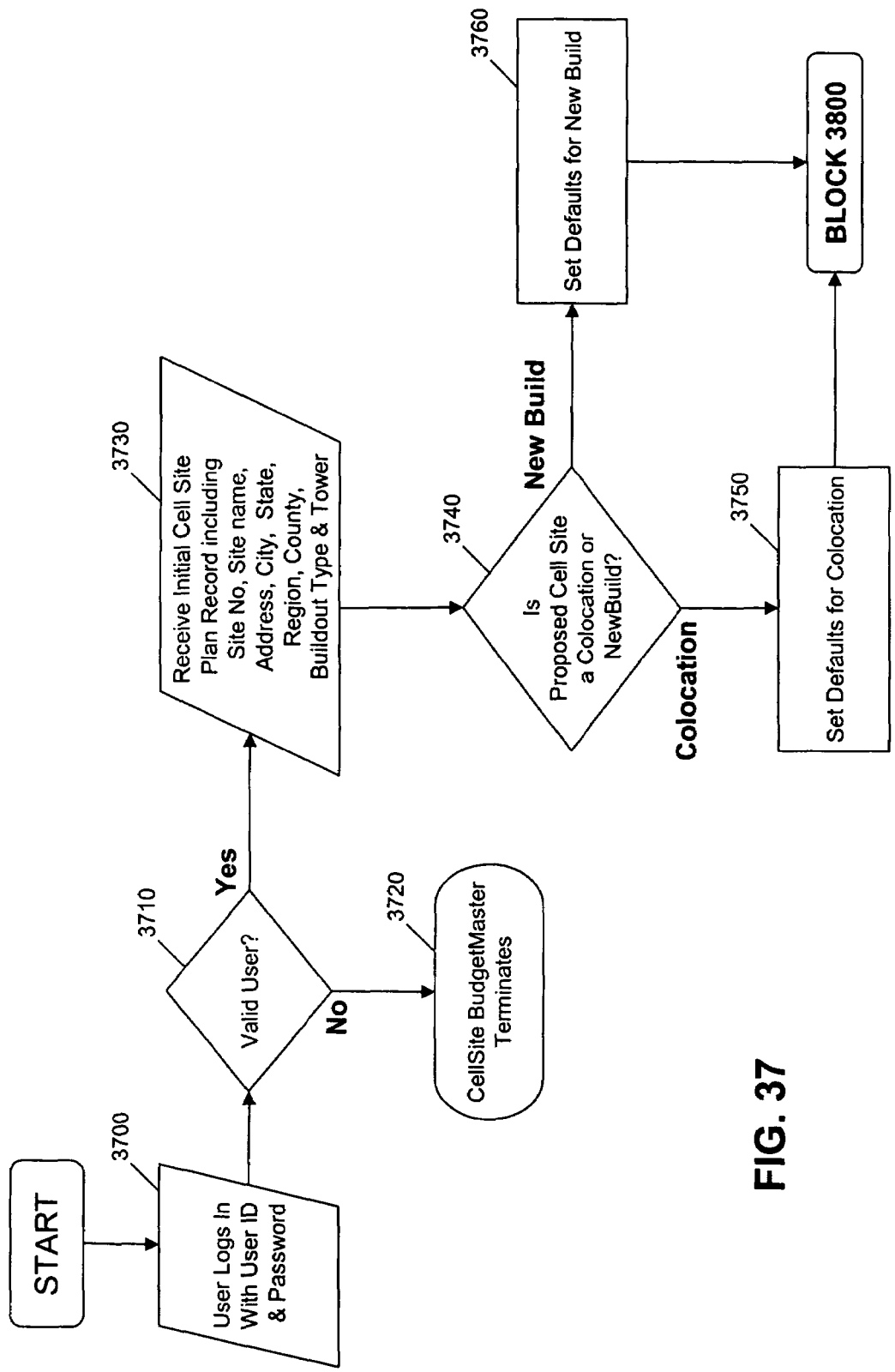
FIGS. 37-39 are flow charts of methods for cell site planning and billing according to embodiments of this invention.
Figure 38:
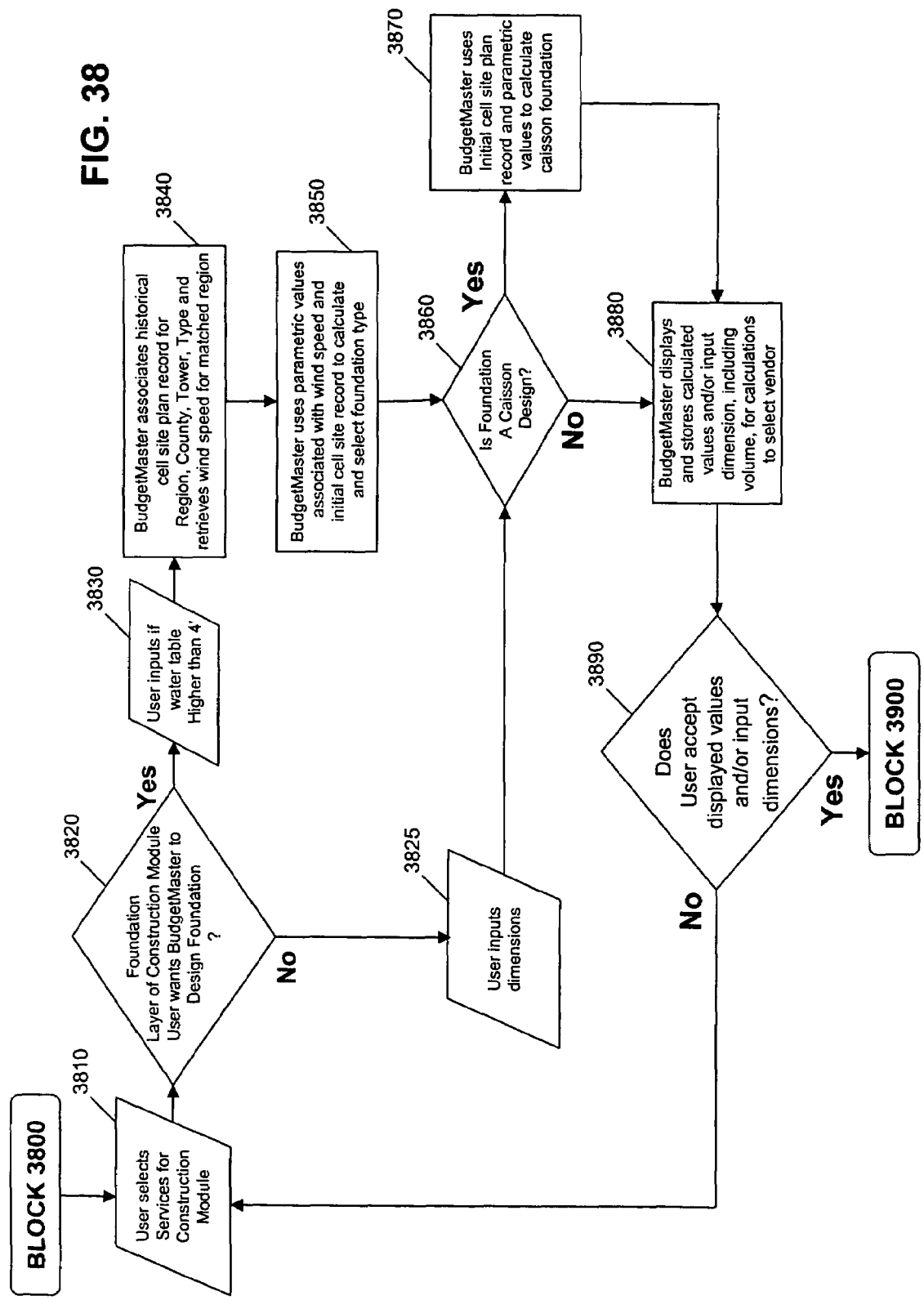
Figure 39:
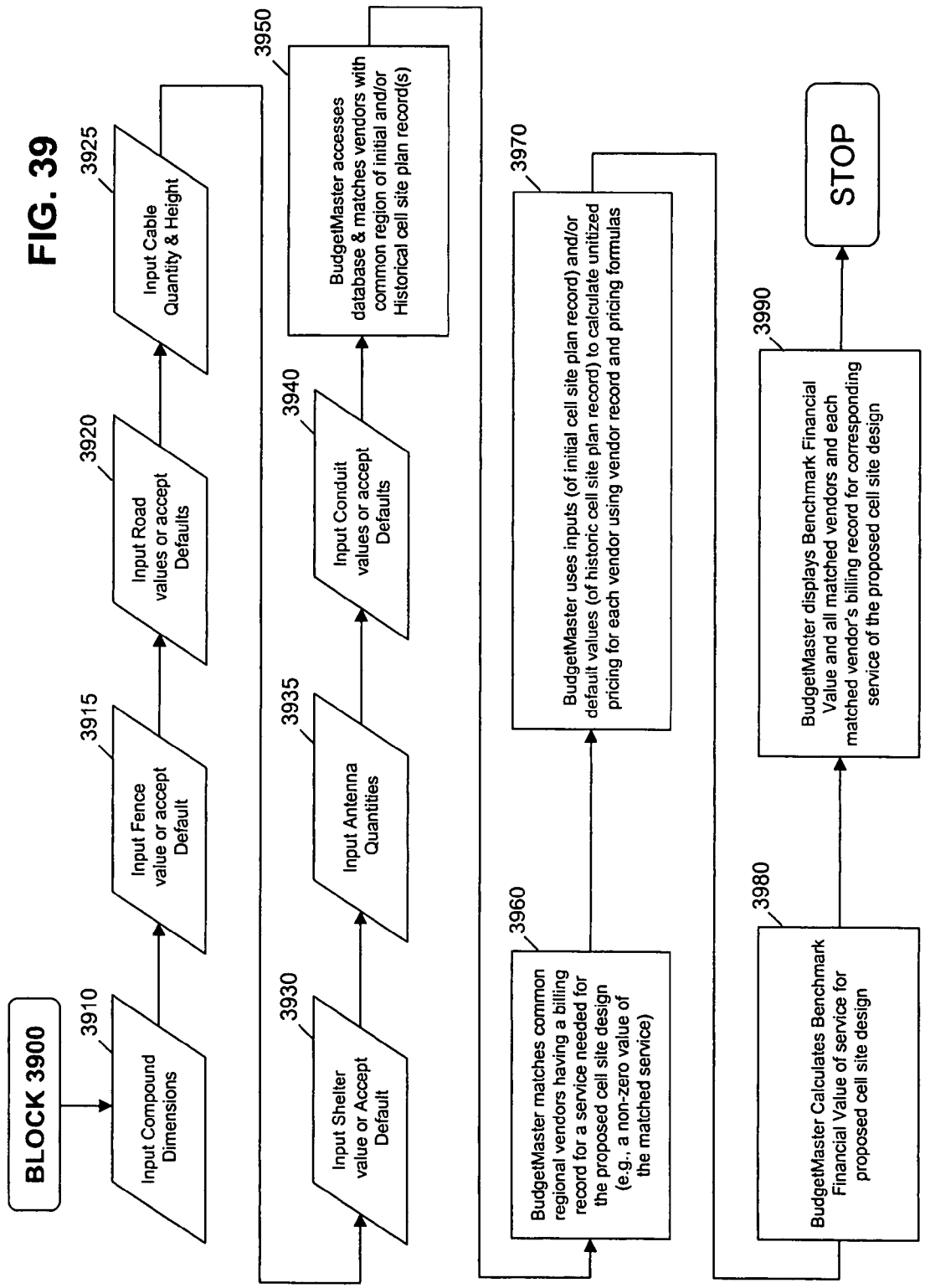

FIGS. 37, 38, and 39 are flowcharts showing processes of cell site planning and billing according to more embodiments of this invention. While the processes in FIGS. 37, 38, and 39 are shown in series, these processes may occur in different orders and/or at simultaneous times as one of ordinary skill in the art will understand.

A user logs onto CellSite BudgetMaster (also referred to as "BudgetMaster") and inputs his/her user name and password [block 3700]. BudgetMaster determines if the user name and password are valid [block 3710]. If the user name and password are not authorized and/or are invalid, then BudgetMaster terminates [block 3720]. If, however, the user name and password are valid, then BudgetMaster prompts the user to input and receives parameters for an initial cell site plan record including site number, site name, address, city, state, region, county, buildout type, and tower [block 3730]. Thereafter, BudgetMaster prompts the user to select whether the proposed new cell site is a colocation or a new build [block 3740]. If the proposed new cell site is a colocation, then BudgetMaster retrieves historic colocation cell site records that are used to populate default values for one of six modules that represent services for the proposed design [block 3750]. If the proposed new cell site is a new build, then BudgetMaster retrieves historic new build cell site records that are used to populate default values for one of six modules that represent services for the proposed design [block 3760]. These six modules include construction, construction management, site acquisition, environmental/geotechnical, structural analysis, and architectural & engineering. After BudgetMaster retrieves the appropriate historical cell site record for default values and/or for defaulted services (e.g., services that are typically performed if the proposed new cell site is a colocation or if the proposed new cell site is a new build), BudgetMaster prompts the user to select one of the six modules (not shown).

In the example set forth in FIG. 38, the method continues with the user having selected a service for the construction module [block 3810]. The user may select whether BudgetMaster is to determine the foundation layer of the proposed new cell site or whether he/she will input values for the foundation layer [block 3820]. If the user wants BudgetMaster to calculate the foundation layer, then the user inputs values to specify if the foundation needs to account for water or no water [block 3830]. Thereafter, BudgetMaster associates historical cell site plan records for region, county, tower, type, and/or wind speed [block 3840] and uses these and other parametric values to calculate the foundation type [block 3850]. Next, BudgetMaster must identify if the foundation is a caisson design [block 3860]. If the design is caisson, then BudgetMaster calculates the caisson foundation [block 3870] and displays the calculated values [block 3880] for the user to accept [block 3890]. The calculations for the caisson foundation use the formulas disclosed in Table 7 below:

TABLE 7

Caisson Calculations

| Tower/Foundation/Designer | 4, 6, 8, 10 diameter | Other diameter |
|---|---|---|
| Self Support (SS)/Caisson (CS)/User | L × matrix price × 3 | (L × diameter × diameter × 3.14 × 3 × matrix price) divided by 108 |
| SS/CS/BudgetMaster | L × Matrix Price × 3 | (Volume × 3 × matrix Price) |

TABLE 7-continued

Caisson Calculations

| Tower/Foundation/Designer | 4, 6, 8, 10 diameter | Other diameter |
|---|---|---|
| Monopole (MP)/CS/User | L × matrix Price | (L × diameter × diameter × 3.14 × matrix price) divided by 108 |
| MP/CS/BudgetMaster | L × matrix Price | (Volume × matrix price) |
| Guyed Tower (GT)/CS/User | (L × matrix price × 3) + (5 × matrix price) | (L × diameter × diameter × 3.14 × 3 × matrix price) divided by 108 + (Base volume × matrix price) |
| GT/CS/BudgetMaster | (Total Volume × matrix Price) | (Total Volume × matrix Price) |

However, if the design is not caisson, then BudgetMaster displays the calculated values [block 3880] for the user to accept [block 3890]. If the user accepts, then the method continues with block 3700. If the user does not accept, then the method may be repeated. If, however, the user inputs values for the foundation layer [block 3825], then BudgetMaster next identifies if the foundation is a caisson design [block 3860]. If the design is caisson, then BudgetMaster uses the input values to calculate the caisson foundation [block 3870] using the formula (s) shown in Table 7, and BudgetMaster displays the calculated values [block 3880] for the user to accept [block 3890]. However, if the design is not caisson, then BudgetMaster displays the input values [block 3880] for the user to confirm [block 3890]. If the user confirms, then the method continues with block 3900. If the user does not confirm, then the method may be repeated.

The method continues with BudgetMaster receiving inputs for compound values [block 3910], inputs and/or defaults for fence values [block 3915], inputs and/or defaults for road values [block 3920], inputs for cable height and quantity [block 3925], inputs and/or defaults for infrastructure/shelter [block 3930], inputs for antenna values [block 3935], and/or inputs and/or defaults for conduit [block 3940]. Thereafter, BudgetMaster assesses one or more databases to match vendors with a common region of the proposed new cell site [block 3950] and, further, matches vendors having a non-zero billing record for a construction service of the proposed cell site design [block 3960]. Next, BudgetMaster uses inputs (associated with the initial cell site record) and/or defaults (associated with the historical cell site record) to calculate total pricing for each matched vendor using the matched vendor's unitized billing record and a unitized pricing formula. For example, a unitized pricing formula for a monopole stack tower having a caisson foundation designed by BudgetMaster for a ten foot diameter would determine total foundation pricing by multiplying a length value times a corresponding unit matrix price. After calculating the unitized pricing for each matched vendor, BudgetMaster calculates a benchmark financial value for the proposed cell site design [block 3980]. Finally, BudgetMaster displays the benchmark financial value and all matched vendors along with each matched vendor's cost for the corresponding service of the proposed cell site design [block 3990]. Other modules use similar methods to calculate values and/or receive user inputs, generate a proposed cell site design, calculate total vendor pricing and a total benchmark financial value (specific to that proposed cell site design and geographic location), and display the results.

Figure 40:
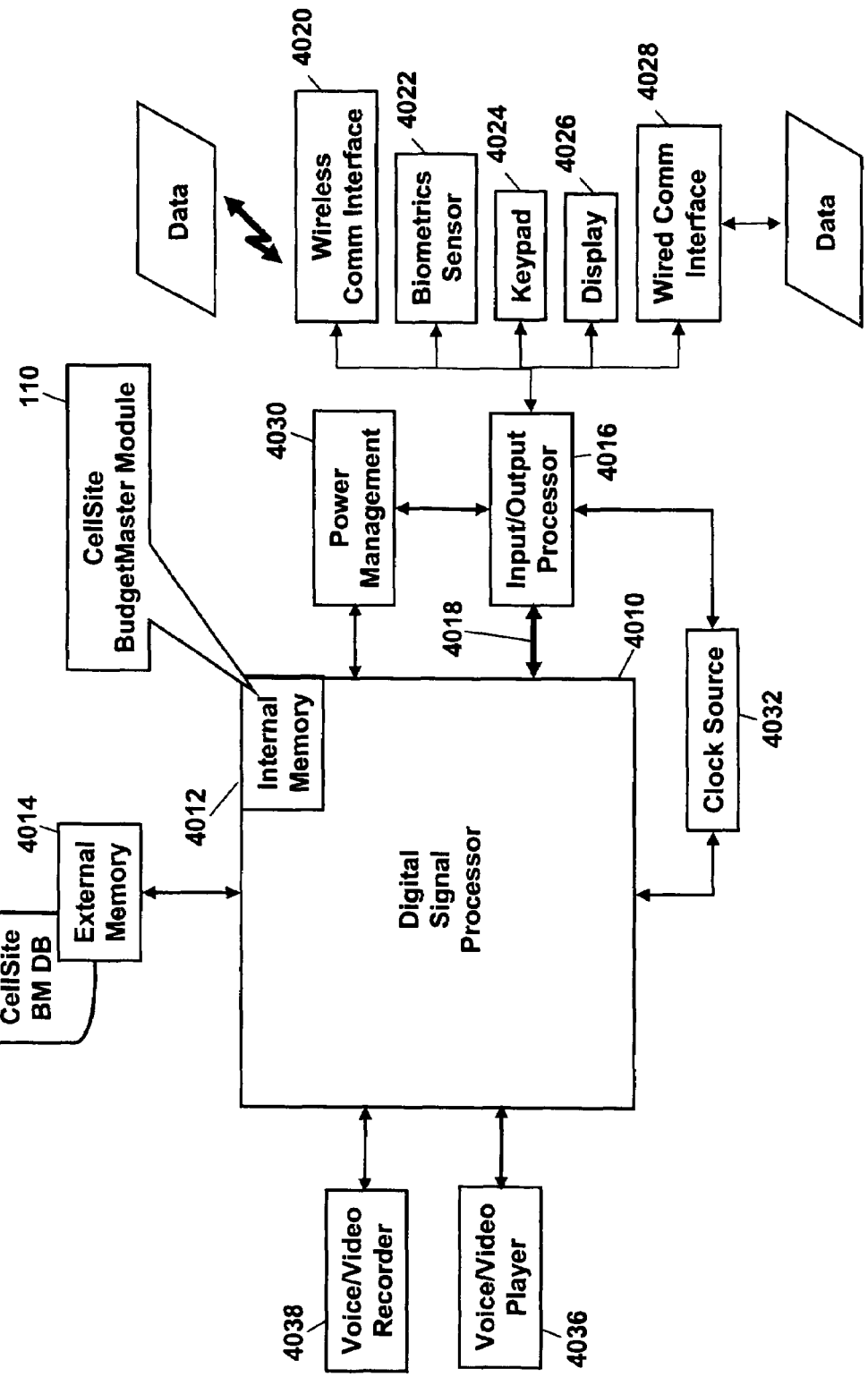
FIG. 40 is an alternate block diagram showing a cell site planning and billing application (also referred to herein as a "CellSite BudgetMaster") that resides in a computer system according to embodiments of this invention.

FIG. 40 is a block diagram of another cell site planning and billing application (also referred to herein as "CellSite BudgetMaster" and "BudgetMaster") embodying this invention. The CellSite BudgetMaster 110 operates within a memory device of a digital signal processor 4010 of a computer system 4000. The memory device could include internal memory 4012 of the digital signal processor 4010, or the memory device could include an external memory 4014 communicating with the digital signal processor 4010. The digital signal processor 4010 converts analog signals to digital signals and converts digital signals to analog signals. The digital signal processor 4010 could include compression and decompression algorithms, cancellation algorithms, audio-processing circuitry, filter circuitry, and amplifier circuitry. Although digital signal processors can be designed to provide differing capabilities and a variety of performance criteria, the basic functions of the digital signal processor are known and, thus, will not be further discussed.

The digital signal processor 4010 interfaces with an input/output processor 4016. The input/output processor 4016 controls system input/output and provides telephony and/or computer control features. A bus 4018 provides a signal communication path between the digital signal processor 4010 and the input/output processor 4016. The input/output processor 4016 is a microprocessor that includes memory (not shown), communication controllers (not shown), and peripheral controllers (not shown). The communication controllers, for example, could control packet-based communications with the connected communications device and a connected network through a wireless communications interface 4020 or through a wired communications interface 4028. The communication controllers could also control packet-based communications with a communications switch (not shown). The peripheral controllers provide an interface with an LCD/LED/CRT display 4026 and with telephony/computer-like control features, such as a keypad 4024. Additionally, the peripheral controllers provide an interface with a biometrics sensor 4022, such as, for example, a fingerprint ID device. The biometrics sensor 4022 may provide security features that prevent unauthorized users from exploiting the computer 4000. The biometrics sensor 4022 could also comprise retina recognition device and software, DNA/RNA recognition device and software, facial recognition device and software, speech recognition device and software, and/or scent recognition device and software.

The digital signal processor 4010 also interfaces with an external voice/video player system 4036 and/or with a voice/video recorder system 4038 to audibly and/or visually communicate data. Further, a clock source 4032 provides a system clock for the computer 4000, and the clock source 4032 may also include higher and lower frequency multiples of the system clock depending upon power requirements and power availability. Still further, a power management system 4030 provides differing power control mechanisms, such as a sleep mode and a low-power mode, to efficiently utilize available power and to reduce thermal management concerns.

While this invention has been described with respect to various features, aspects, and embodiments, those skilled and unskilled in the art will recognize the invention is not so limited. Other variations, modifications, and alternative embodiments may be made without departing from the spirit and scope of this invention.

What is claimed is:

1. A method comprising:
accessing at least one data storage device to retrieve:
  initial cell site data;
  historic cell site data; and
  vendor data;
using at least one processor to:
  generate a proposed cell site design based on the initial cell site data and the historic cell site data; and
  generate a billing record by associating the accessed vendor data with the proposed cell site design, wherein:
    the initial cell site data comprises a cell site identifier, a new cell site parameter, a colocation parameter, a water parameter, a parametric record, a construction record, an environmental record, a management record, an architectural record, a structural record, and a site acquisition record;
    the vendor data comprises a contractor identifier, a construction billing record for a construction service, an environmental billing record for an environmental service, a management billing record for a management service, an architectural billing record for an architectural service, a structural billing record for a structural service, and a site acquisition billing record for a site acquisition service; and
    a compiled cell site plan and billing record comprises a proposed cell site design and a benchmark financial value of the proposed cell site design; and
  associate the initial cell site data, the historic cell site data, and the vendor data, wherein associating the initial cell site data, the historic cell site data, and the vendor data further comprises:
  matching the cell site identifier and the historic cell site identifier with the contractor identifier having a common geographic region;
  matching the construction record and the historic construction record with a construction billing record;
  matching the environmental record and the historic environmental record with the environmental billing record;
  matching the management record and the historic management record with the management billing record;
  matching the architectural record and the historic architectural record with the architectural billing record;
  matching the structural record and the historic structural record with the structural billing record; and
  matching the site acquisition record and the historic site acquisition record with the site acquisition billing record.

2. The method of claim 1, wherein the benchmark financial value of the proposed cell site design is calculated using an average of at least two vendor records.

3. The method of claim 1, further comprising:
displaying at least one of the initial cell site data, the historic cell site data, the vendor data, and a compiled cell site plan and billing record; and
generating a report of at least one of the compiled cell site plan and billing record, the initial cell site plan record, the vendor record and the historic cell site plan record.

4. A method comprising:
accessing at least one data storage device to retrieve:
  initial cell site data;
  historic cell site data; and
  vendor data;
using at least one processor to:
  generate a proposed cell site design based on the initial cell site data and the historic cell site data; and
  generate a billing record by associating the accessed vendor data with the proposed cell site design, wherein:
    the initial cell site data comprises a cell site identifier, a new cell site parameter, a colocation parameter, a water parameter, a parametric record, a construction record, an environmental record, a management record, an architectural record, a structural record, and a site acquisition record;
    the vendor data comprises a contractor identifier, a construction billing record for a construction service, an environmental billing record for an environmental service, a management billing record for a management service, an architectural billing record for an architectural service, a structural billing record for a structural service, and a site acquisition billing record for a site acquisition service; and
    a compiled cell site plan and billing record comprises a proposed cell site design and a benchmark financial value of the proposed cell site design;
  associate the initial cell site data, the historic cell site data, and the vendor data;
  use the compiled cell site plan and billing record to select the contractor identifier, the selected contractor identifier comprising a named contractor for a selected service of the proposed cell site design, the selected service comprising at least one of the constructions service, the environmental service, the management service, an architectural service, the structural service, and the site acquisition service; and
  present the vendor record of the selected contractor identifier, the vendor record identifying at least one of the construction billing record for the construction service, the environmental billing record for the environmental service, the management billing record for the management service, the architectural billing record for the architectural service, the structural billing record for the structural service, and the site acquisition billing record for the site acquisition service, wherein:
  the benchmark financial value of the proposed cell site design is calculated by:
    selecting a plurality of vendor records having the contractor identifier match a common geographic region of the cell site identifier;
    ranking the selected vendor records from a highest financial value to a lowest financial value;
    ignoring a percentage of the selected vendor records; and
    calculating an average of the remaining selected vendor records.

5. The method of claim 4, wherein the percentage of the selected vendor records is approximately ten percent of the selected vendor records having the lowest financial values.

6. A method comprising:
accessing at least one data storage device to retrieve:
  initial cell site data;
  historic cell site data; and
  vendor data;
using at least one processor to:
  generate a proposed cell site design based on the initial cell site data and the historic cell site data; and generate a billing record by associating the accessed vendor data with the proposed cell site design, wherein:
  the initial cell site data comprises a cell site identifier, a new cell site parameter, a colocation parameter, a water parameter, a parametric record, a construction record, an environmental record, a management record, an architectural record, a structural record, and a site acquisition record;
  the vendor data comprises a contractor identifier, a construction billing record for a construction service, an environmental billing record for an environmental service, a management billing record for a management service, an architectural billing record for an architectural service, a structural billing record for a structural service, and a site acquisition billing record for a site acquisition service; and
  a compiled cell site plan and billing record comprises a proposed cell site design and a benchmark financial value of the proposed cell site design;
associate the initial cell site data, the historic cell site data, and the vendor data;
use the compiled cell site plan and billing record to select the contractor identifier, the selected contractor identifier comprising a named contractor for a selected service of the proposed cell site design, the selected service comprising at least one of the constructions service, the environmental service, the management service, an architectural service, the structural service, and the site acquisition service; and
present the vendor record of the selected contractor identifier, the vendor record identifying at least one of the construction billing record for the construction service, the environmental billing record for the environmental service, the management billing record for the management service, the architectural billing record for the architectural service, the structural billing record for the structural service, and the site acquisition billing record for the site acquisition service, wherein the benchmark financial value of the proposed cell site design is calculated by:
  selecting a plurality of vendor records having the contractor i identifier match a common geographic region of the cell site identifier;
  ranking the selected vendor records from a highest financial value to a lowest financial value;
  ignoring a percentage of the selected vendor records having the lowest financial values;
  ignoring a percentage of the selected vendor records having the highest financial values; and
  calculating an average of the remaining vendor records.

7. The method of claim 6, wherein the percentage of the selected vendor records having the highest financial values is approximately ten percent of the selected vendor records having the highest financial values.

8. A method comprising:
  accessing at least one data storage device to retrieve:
    initial cell site data;
    historic cell site data; and
    vendor data;
  using at least one processor to:
    generate a proposed cell site design based on the initial cell site data and the historic cell site data; and
    generate a billing record by associating the accessed vendor data with the proposed cell site design, wherein:
      the initial cell site data comprises a cell site identifier, a new cell site parameter, a colocation parameter, a water parameter, a parametric record, a construction record, an environmental record, a management record, an architectural record, a structural record, and a site acquisition record;
      the vendor data comprises a contractor identifier, a construction billing record for a construction service, an environmental billing record for an environmental service, a management billing record for a management service, an architectural billing record for an architectural service, a structural billing record for a structural service, and a site acquisition billing record for a site acquisition service; and
      a compiled cell site plan and billing record comprises a proposed cell site design and a benchmark financial value of the proposed cell site design;
    associate the initial cell site data, the historic cell site data, and the vendor data;
    use the compiled cell site plan and billing record to select the contractor identifier, the selected contractor identifier comprising a named contractor for a selected service of the proposed cell site design, the selected service comprising at least one of the constructions service, the environmental service, the management service, an architectural service, the structural service, and the site acquisition service;
    present the vendor record of the selected contractor identifier, the vendor record identifying at least one of the construction billing record for the construction service, the environmental billing record for the environmental service, the management billing record for the management service, the architectural billing record for the architectural service, the structural billing record for the structural service, and the site acquisition billing record for the site acquisition service; and
    use the benchmark financial value to update the vendor record such that at least one of the contract identifier, the construction billing record, the environmental billing record, the management billing record, the architectural billing record, the structural billing record, and the site acquisition billing record supplants the original vendor record.

* * * * *